US012556730B2

(12) United States Patent
Ye et al.

(10) Patent No.: US 12,556,730 B2
(45) Date of Patent: Feb. 17, 2026

(54) BLOCK ADAPTIVE MULTI-HYPOTHESIS CROSS COMPONENT PREDICTION

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 135 days.

(21) Appl. No.: 18/497,915

(22) Filed: Oct. 30, 2023

(65) Prior Publication Data

US 2025/0080763 A1   Mar. 6, 2025

Related U.S. Application Data

(60) Provisional application No. 63/535,472, filed on Aug. 30, 2023.

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .... H04N 19/593; H04N 19/70; H04N 19/105; H04N 19/132; H04N 19/44; H04N 19/11; H04N 19/176; H04N 19/186
See application file for complete search history.

(56) References Cited

U.S. PATENT DOCUMENTS

2015/0117554 A1   4/2015   Chong et al.
2019/0230352 A1*  7/2019   Heo ..................... H04N 19/186
(Continued)

FOREIGN PATENT DOCUMENTS

WO   WO 2023050072 A1   4/2023

OTHER PUBLICATIONS

Tencent Technology, ISR/WO, PCT/US2023/036535, Feb. 22, 2024, 17 pgs.

(Continued)

*Primary Examiner* — Neil R Mikeska
(74) *Attorney, Agent, or Firm* — Morgan, Lewis & Bockius LLP

(57) ABSTRACT

The various implementations described herein include methods and systems for coding video. In one aspect, a video bitstream includes a current coding block of an image frame and signals a cross-component intra prediction mode and a hypothesis tap index. An computing system identifies a first luma sample and a first chroma sample co-located with the first luma sample in the current coding block, and selects one of a plurality of hypothesis tap combinations based on the hypothesis tap index. The computing system identifies neighboring luma samples of the first luma sample based on the selected hypothesis tap combinations, and generates hypothesis values based on the identified neighboring luma samples of the first luma sample. The computing system further generates the first chroma sample based on at least the first luma sample and the hypothesis values, and reconstructs the current coding block including the first chroma sample.

25 Claims, 15 Drawing Sheets

(51) Int. Cl.
*H04N 19/132* (2014.01)
*H04N 19/176* (2014.01)
*H04N 19/186* (2014.01)
*H04N 19/70* (2014.01)

(52) U.S. Cl.
CPC ......... *H04N 19/176* (2014.11); *H04N 19/186* (2014.11); *H04N 19/70* (2014.11)

(56) References Cited

U.S. PATENT DOCUMENTS

| | | |
|---|---|---|
| 2021/0092395 A1* | 3/2021 | Zhang .................. H04N 19/132 |
| 2021/0195200 A1 | 6/2021 | Chen et al. |
| 2021/0235072 A1* | 7/2021 | Ko ....................... H04N 19/157 |
| 2021/0297656 A1 | 9/2021 | Ma et al. |
| 2021/0329261 A1 | 10/2021 | Ma et al. |
| 2021/0409732 A1 | 12/2021 | Zhao et al. |
| 2022/0030257 A1 | 1/2022 | Deng et al. |
| 2022/0078481 A1* | 3/2022 | Lainema .............. H04N 19/149 |
| 2022/0239897 A1 | 7/2022 | Deng et al. |
| 2022/0248025 A1* | 8/2022 | Deng .................... H04N 19/132 |
| 2022/0264101 A1 | 8/2022 | Koo et al. |
| 2022/0286674 A1 | 9/2022 | Wang et al. |
| 2022/0295061 A1* | 9/2022 | Zhang .................... H04N 19/12 |
| 2022/0345718 A1 | 10/2022 | Rosewarne et al. |
| 2022/0385926 A1* | 12/2022 | Deng .................... H04N 19/105 |
| 2023/0057680 A1 | 2/2023 | Ma et al. |
| 2023/0117813 A1* | 4/2023 | Deng .................... H04N 19/132 |
| 2023/0217026 A1 | 7/2023 | Li et al. |
| 2023/0344990 A1* | 10/2023 | Deng ................... H04N 19/1883 |
| 2023/0345015 A1 | 10/2023 | Ye et al. |
| 2023/0370602 A1 | 11/2023 | Onno et al. |
| 2024/0236363 A1 | 7/2024 | Jung et al. |
| 2024/0244254 A1 | 7/2024 | Jung et al. |
| 2024/0397062 A1 | 11/2024 | Xu |

OTHER PUBLICATIONS

Tencent Technology, ISR/WO, PCT/US2023/036479, Mar. 14, 2024, 13 pgs.
Tencent Technology, ISR/WO, PCT/US2023/036481, Mar. 4, 2024, 16 pgs.
Tencent Technology, ISR/WO, PCT/US2023/036534, Feb. 22, 2024, 12 pgs.
Jianle Chen et al., "Algorithm Description for Versatile Video Coding and Test Model 10 (VTM 10)", JVET-S2002, Video Experts Team (JVET) of ITU-T SG 16 WP 3 and ISO/IEC JTC 1/SC 29/WG 11 19th Meeting, Jun. 22-Jul. 1, 2020, 97 pgs.
Pekka Astola, et al., "AHG12: Convolutional Cross-Component Model (CCCM) for Intra Prediction", Document: JVET-Z0064-v1, Joint Video Experts Team (JVET) of ITU-T SG 16 WP 3 and ISO/IEC JTC 1/SC 29 26th Meeting, Apr. 20-29, 2022, 5 pgs.
Peter de Rivaz et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.
Xin Zhao et al., "Tool Description for AOMedia Video Model (AVM)", Document: CWG-B100_v1, Alliance for Open Media Codec Working Group, Jan. 3, 2022, 52 pgs.
Yue Chen et al., "An Overview of Core Coding Tools in the AV1 Video Codec", 2018 IEEE Picture Coding Symposium, San Francisco, CA, USA, 5 pgs.

* cited by examiner $$\text{predChromaVal} = c_0 e + c_1 a + c_3 c + c_5 P + c_6 B$$

$$\text{predChromaVal} = c_0 e + c_2 b + c_4 d + c_5 P + c_6 B$$

BLOCK ADAPTIVE MULTI-HYPOTHESIS CROSS COMPONENT PREDICTION

RELATED APPLICATIONS

This application claims priority to U.S. Provisional Patent Application No. 63/535,472, entitled "Block Adaptive Multi-Hypothesis Cross Component Prediction," filed Aug. 30, 2023, which is hereby incorporated by reference in its entirety.

TECHNICAL FIELD

The disclosed embodiments relate generally to video coding, including but not limited to systems and methods for cross component intra prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes applying a plurality of parameters to implement cross component intra prediction of video data in a cross-component intra prediction (CCIP) mode where each of a plurality of chroma samples of a current coding block is determined based on one or more luma samples. A linear or nonlinear weighted sum of multiple versions of luma samples is used to predict a chroma sample, e.g., in multi-hypothesis cross-component prediction (MH-CCP). The multiple versions of luma samples includes a luma sample C that is co-located with the chroma sample and a filtered luma sample that is determined based on neighboring luma samples (e.g., W, N, E, S, NW, NE, SW, SE in FIG. 4A) and applied as a filtering input. Each filtering input to a weighted sum is called a hypothesis. Each hypothesis is associated with a weighing factor in MH-CCP. In one aspect of the application, a hypothesis tap index is signaled in a video bitstream communicated from an encoder to a decoder, and applied to select one of a plurality of hypothesis tap combinations for at least the current coding block. In another aspect of the application, weighing factors that are applied to generate the linear or nonlinear weighed sum are determined for each coding block based on a reference area of the respective coding block. In some embodiments, these weighing factors are determined by applying a least mean square calculation kernel to process reconstructed samples of reference blocks of each coding block.

In accordance with some embodiments, a method of video decoding is provided. The method includes receiving a video bitstream including a current coding block of a current image frame. The video bitstream includes the video bitstream signals (i) a first syntax element for a cross-component intra prediction (CCIP) mode indicating each chroma sample of the current coding block is determined based on one or more luma samples and (ii) a second syntax element for a hypothesis tap index selecting one of a plurality of hypothesis tap combinations for at least the current coding block. The method further includes determining the one of the plurality of hypothesis tap combinations based on the hypothesis tap index. The method further includes generating a plurality of hypothesis values based on a plurality of neighboring luma samples of a first luma sample based on the selected one of the plurality of hypothesis tap combinations, and generating a first chroma sample co-located with the first luma sample based on at least the first luma sample and the plurality of hypothesis values. The method further includes reconstructing the current coding block including the first chroma sample.

In accordance with some embodiments, a method of video decoding is provided. The method includes receiving a video bitstream including a current coding block of a current image frame. The video bitstream includes (i) a first syntax element for a cross-component intra prediction (CCIP) mode indicating whether each chroma sample of the current coding block is determined based on one or more luma samples and (ii) a second syntax element for a hypothesis tap index selecting one of a plurality of hypothesis tap combinations for at least the current coding block. The method includes selecting the one of the plurality of hypothesis tap combinations based on the hypothesis tap index and generating a plurality of hypothesis values based on a plurality of neighboring luma samples of a first luma sample based on the selected one of the plurality of hypothesis tap combinations. The method includes generating a first chroma sample co-located with the first luma sample based on at least the first luma sample and the plurality of hypothesis values and reconstructing the current coding block including the first chroma sample.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes cross component intra prediction of video data in a cross-component intra prediction (CCIP) mode where each of a plurality of chroma samples of a current coding block is determined based on one or more associated luma samples. For example, the CCIP mode includes a multi-hypothesis cross-component prediction (MH-CCP) mode in which multiple versions of luma samples are combined to generate a linear or nonlinear weighted sum as a chroma sample. The multiple versions of luma samples includes a luma sample C that is co-located with the chroma sample and a filtered luma sample, which is also called a hypothesis and equal to a weighted combination of two or more neighboring luma samples of the luma sample C. The luma sample C and a plurality of hypothesis values are combined based on a plurality of weighing factors to generate the chroma sample co-located with the luma sample C. In one aspect of the application, a hypothesis tap index is signaled in a video bitstream communicated from an encoder to a decoder, and applied to select one of a plurality of hypothesis tap combinations for at least the current coding block. In another aspect of the application, weighing factors that are applied to generate the linear or nonlinear weighed sum are determined for each coding block based on a reference area of the respective coding block.

In some embodiments, the plurality of weighing factors are applied jointly with one or two additional weighing factors to combine the luma sample C and hypothesis values with a nonlinear term and a bias term. For example, the cross-shaped 5-tap filter has five inputs consists of a center (C) luma sample that is collocated with a chroma sample to be predicted and four hypothesis values, e.g., each including a combination of two or more of an above/north (N) neighboring sample, a below/south(S) neighboring sample, a left/west (W) neighboring sample, and a right/east (E) neighboring sample. The nonlinear term P represents a square of the center luma sample C that is scaled to a sample value range. The bias term B represents a scalar offset between the inputs and output, and for example, is set to a middle chroma value (512 for 10-bit content). In some embodiments, an output of the filter is determined as a convolution between the weighing factors ci (also called filter coefficients ci) and the input luma sample C and hypothesis values, and clipped to a range of valid chroma samples.

Figure 1:
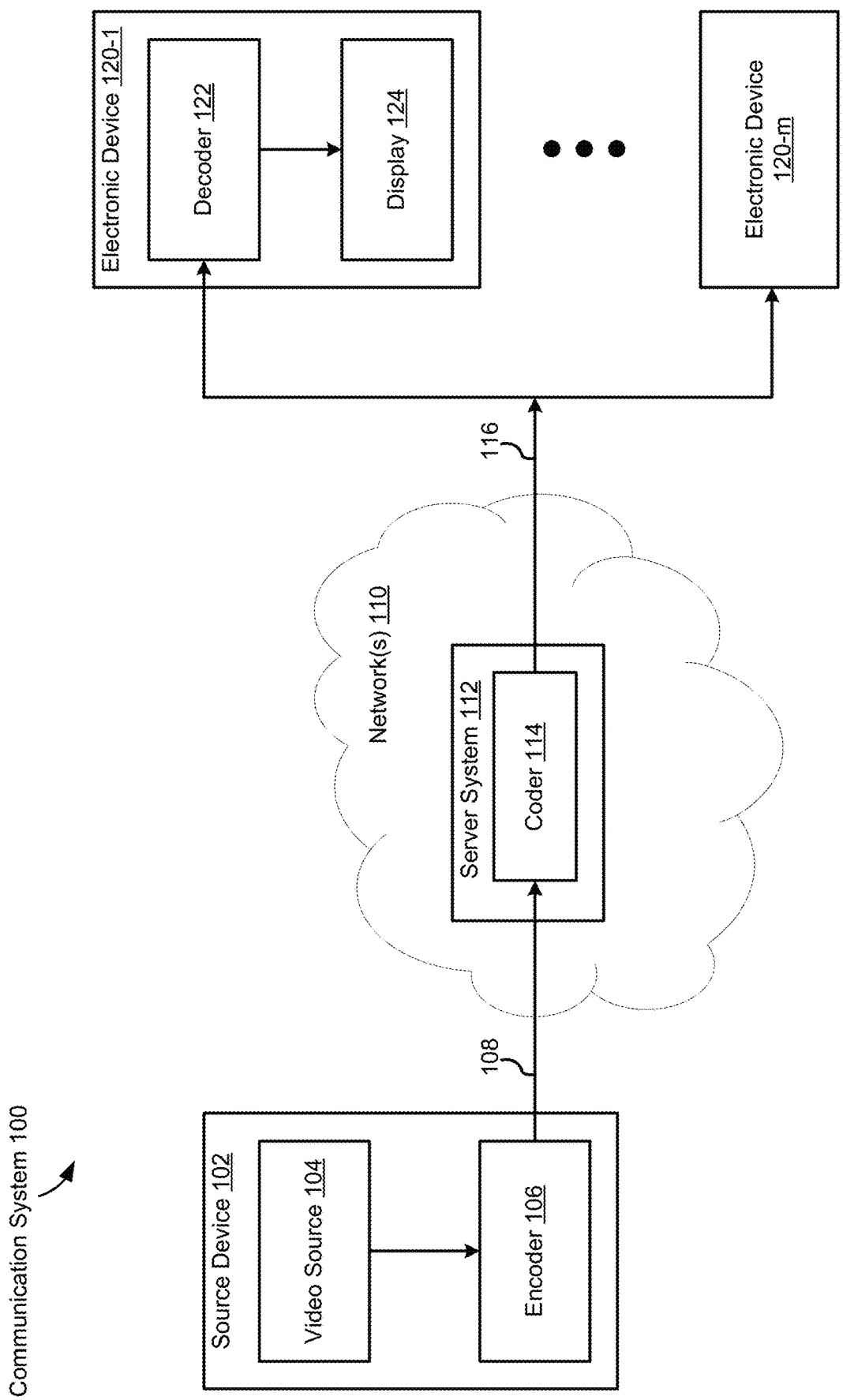
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
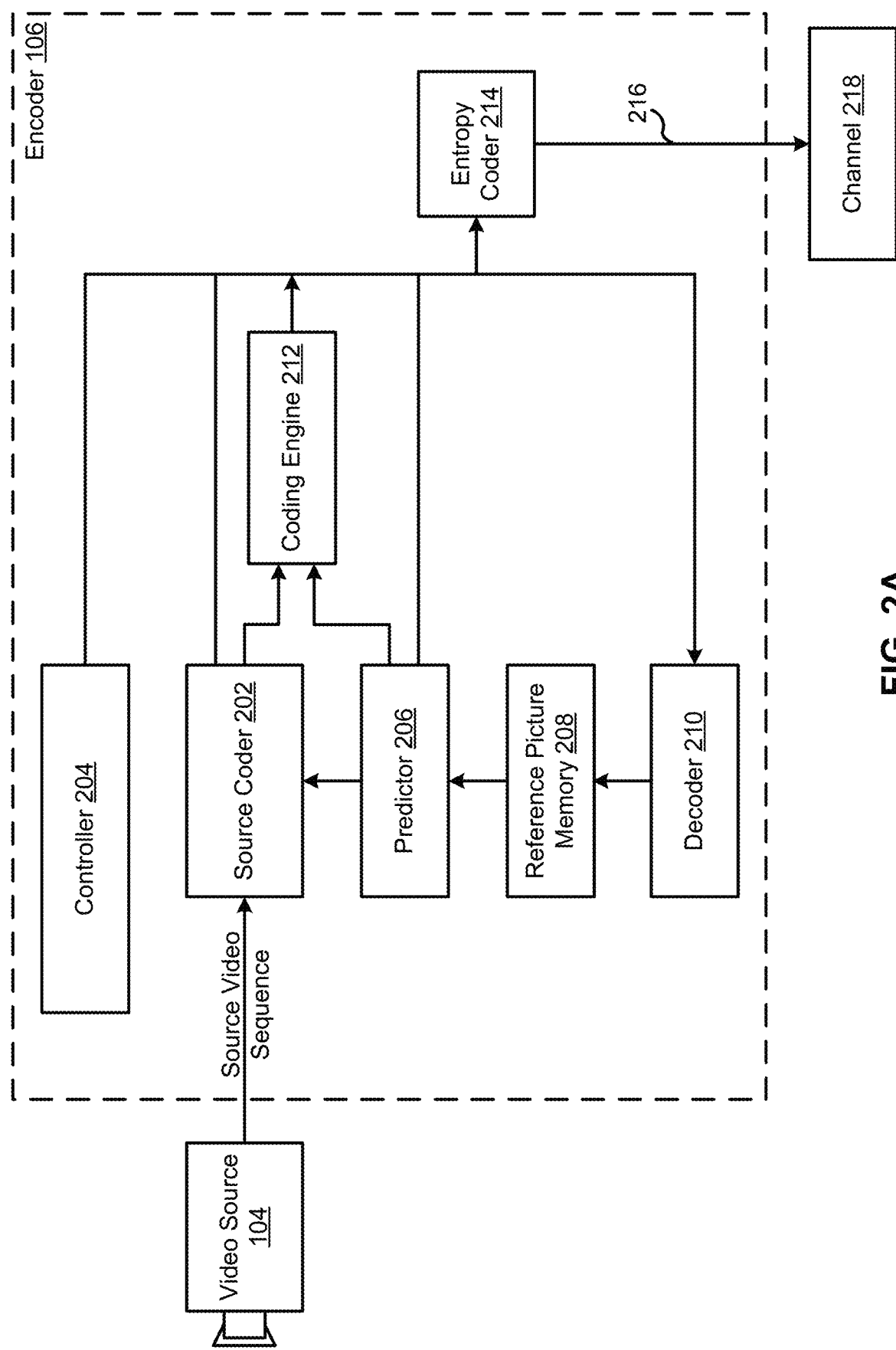
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference image frames. In this manner, the coding engine 212 codes differences between pixel blocks of an input frame and pixel blocks of reference image frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference image frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference image frames and may cause reconstructed reference image frames to be stored in the reference picture memory 208. In this manner, the encoder component 106 stores copies of reconstructed reference image frames locally that have common content as the reconstructed reference image frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices. Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
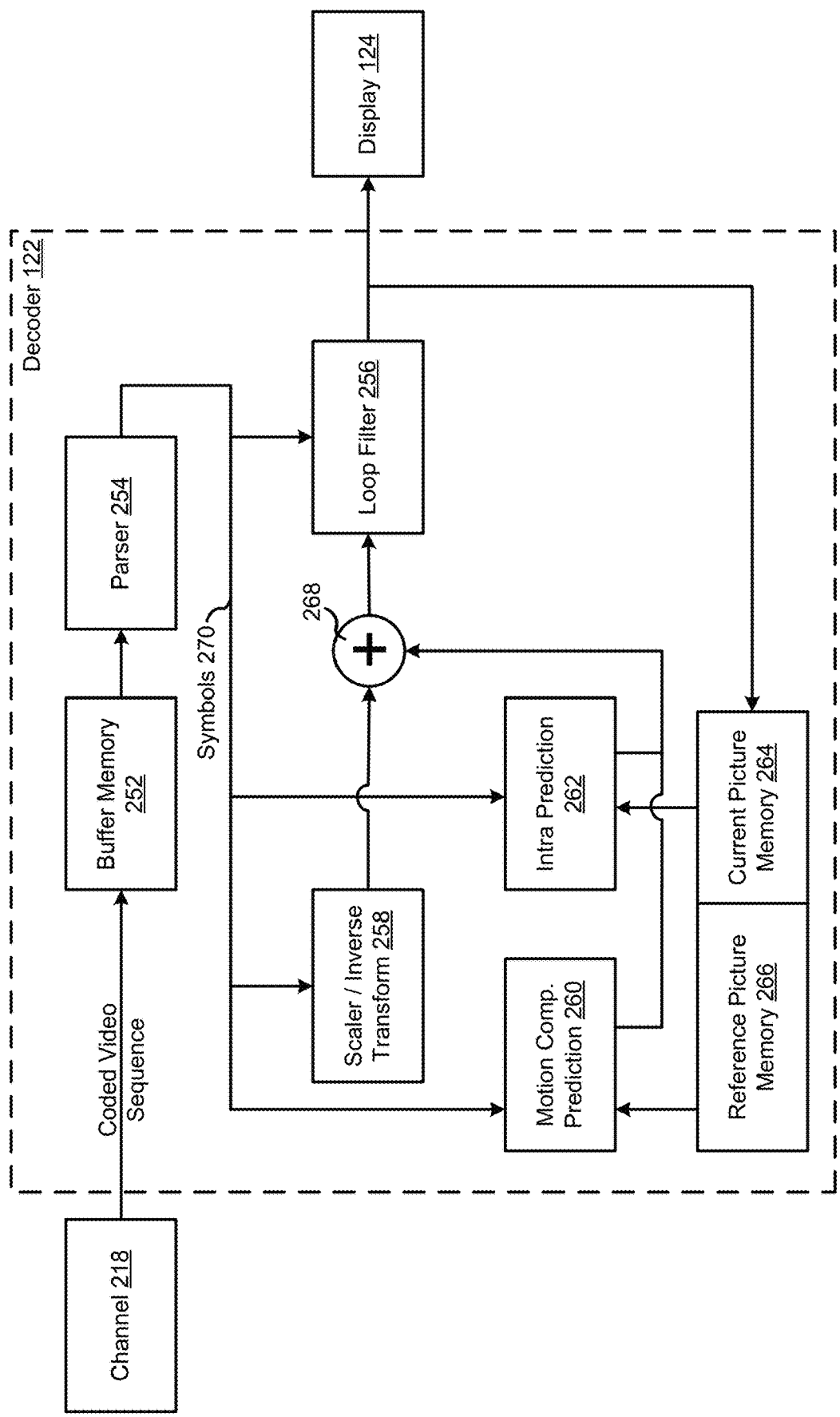
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to reconstruct the original video data more accurately. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI)

parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
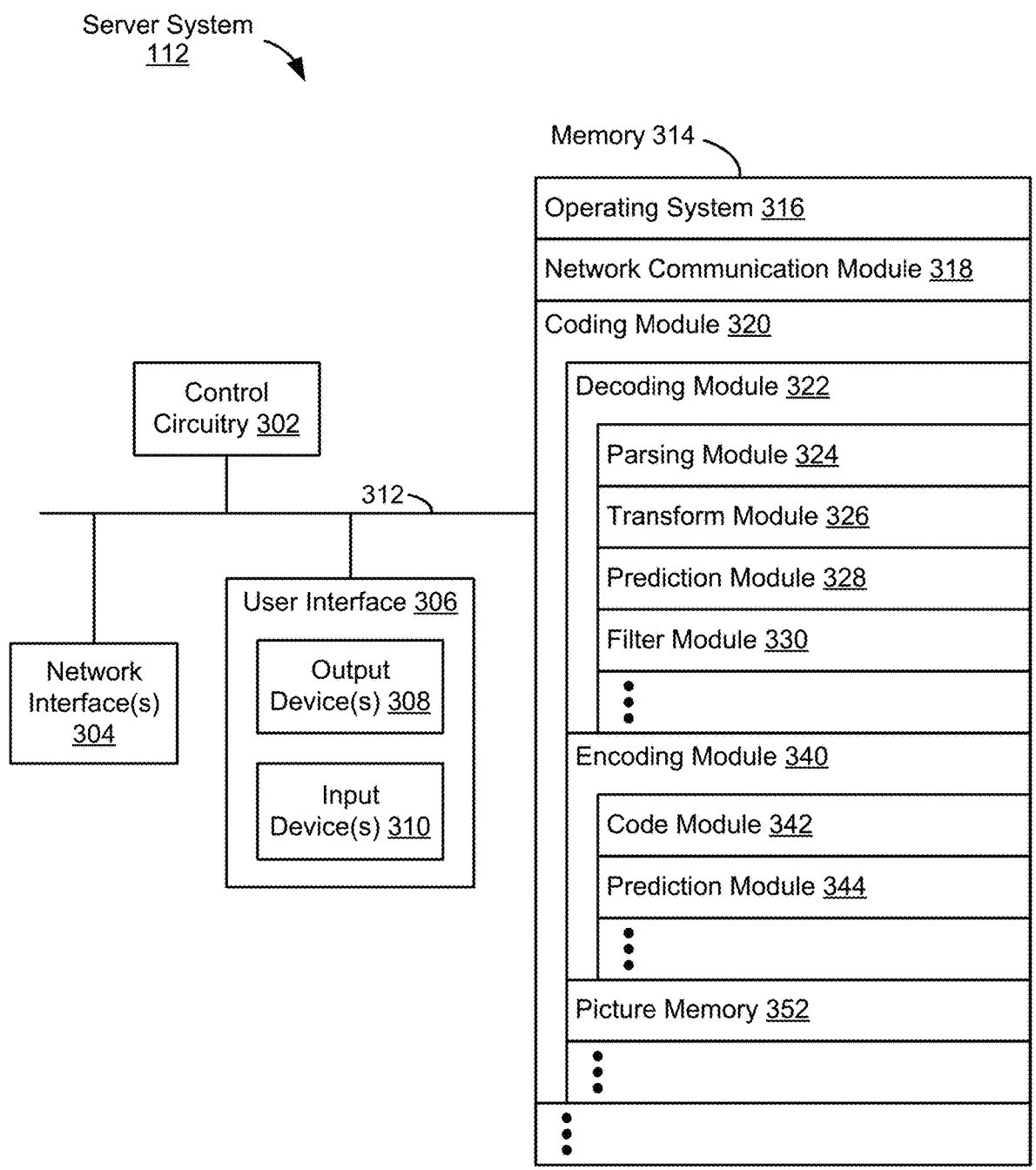
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206).

In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4A:
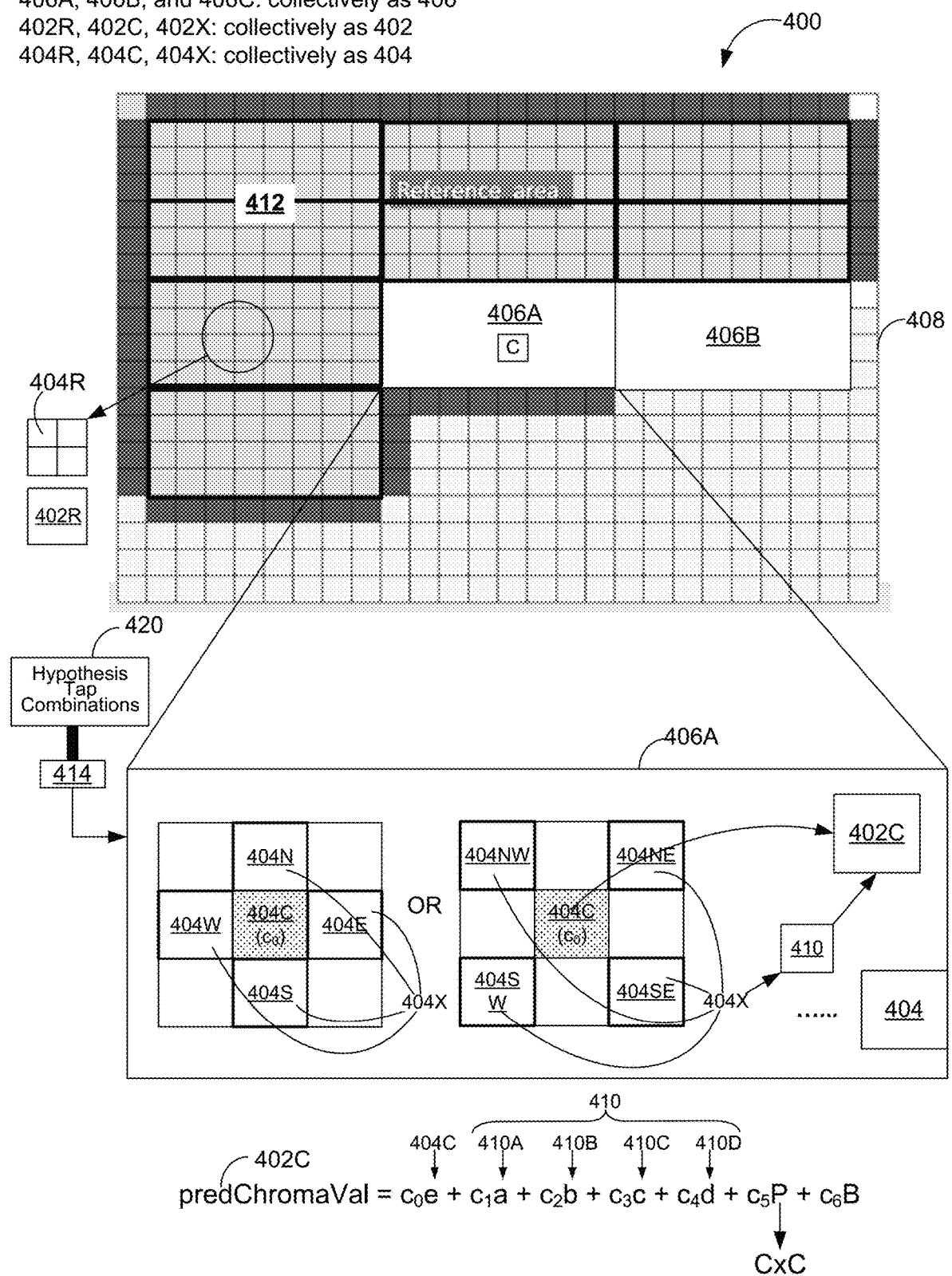
FIG. 4A illustrates an example scheme for generating a first chroma sample from a plurality of luma samples, in accordance with some embodiments.
Figure 4B:
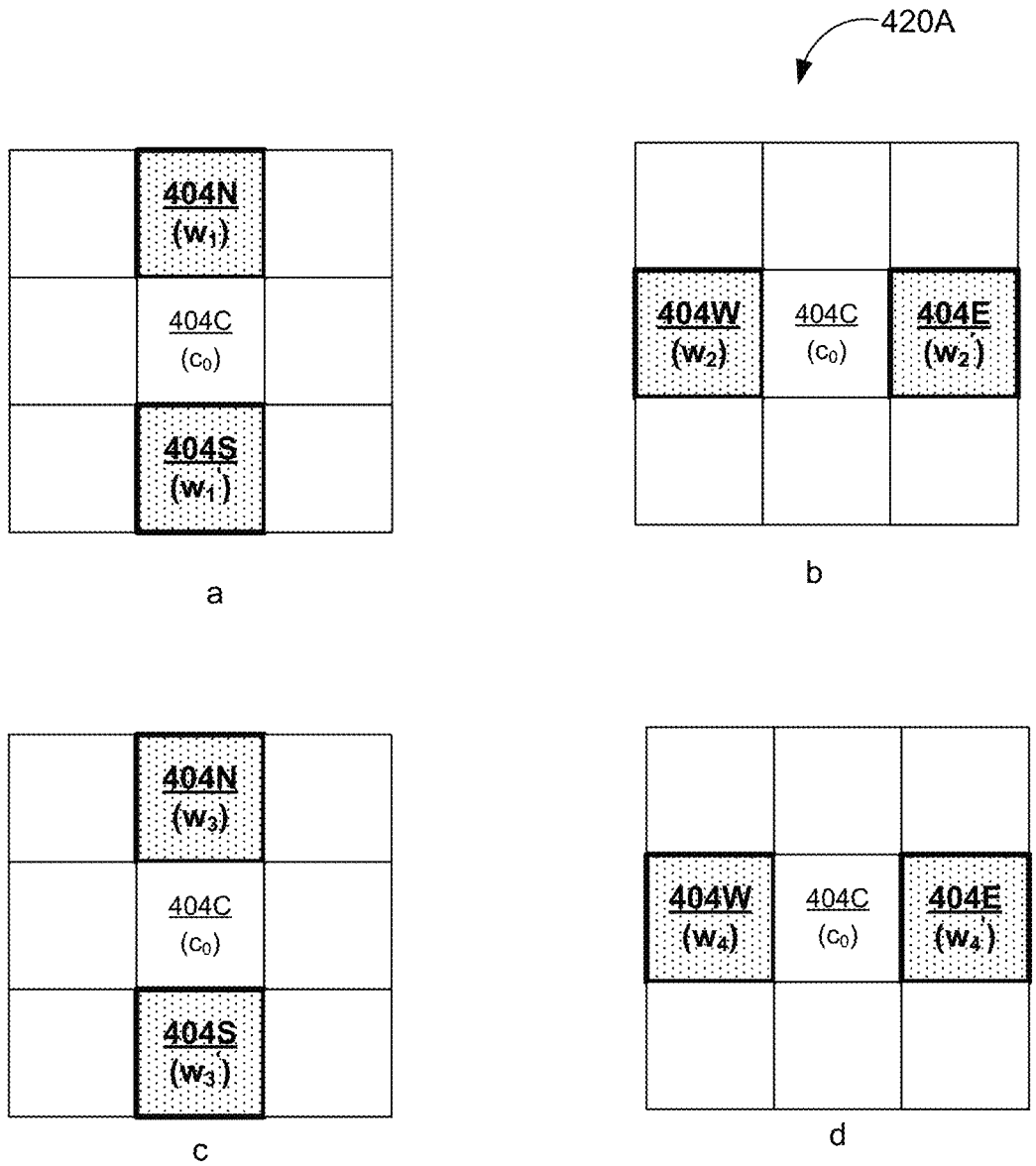
FIGS. 4B and 4C are schematic diagrams of two hypothesis tap combinations including four neighboring luma samples of a first luma sample, in accordance with some embodiments.
Figure 4B:
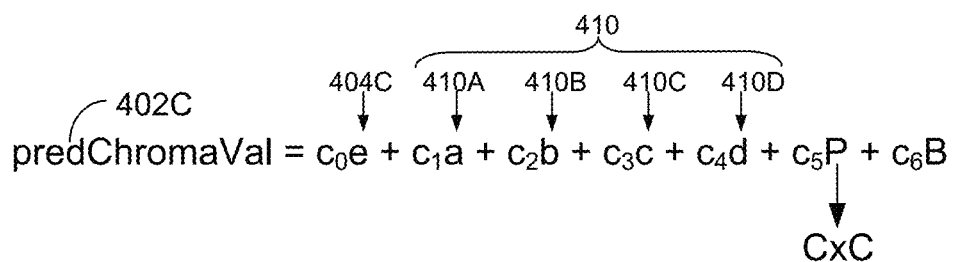
Figure 4C:
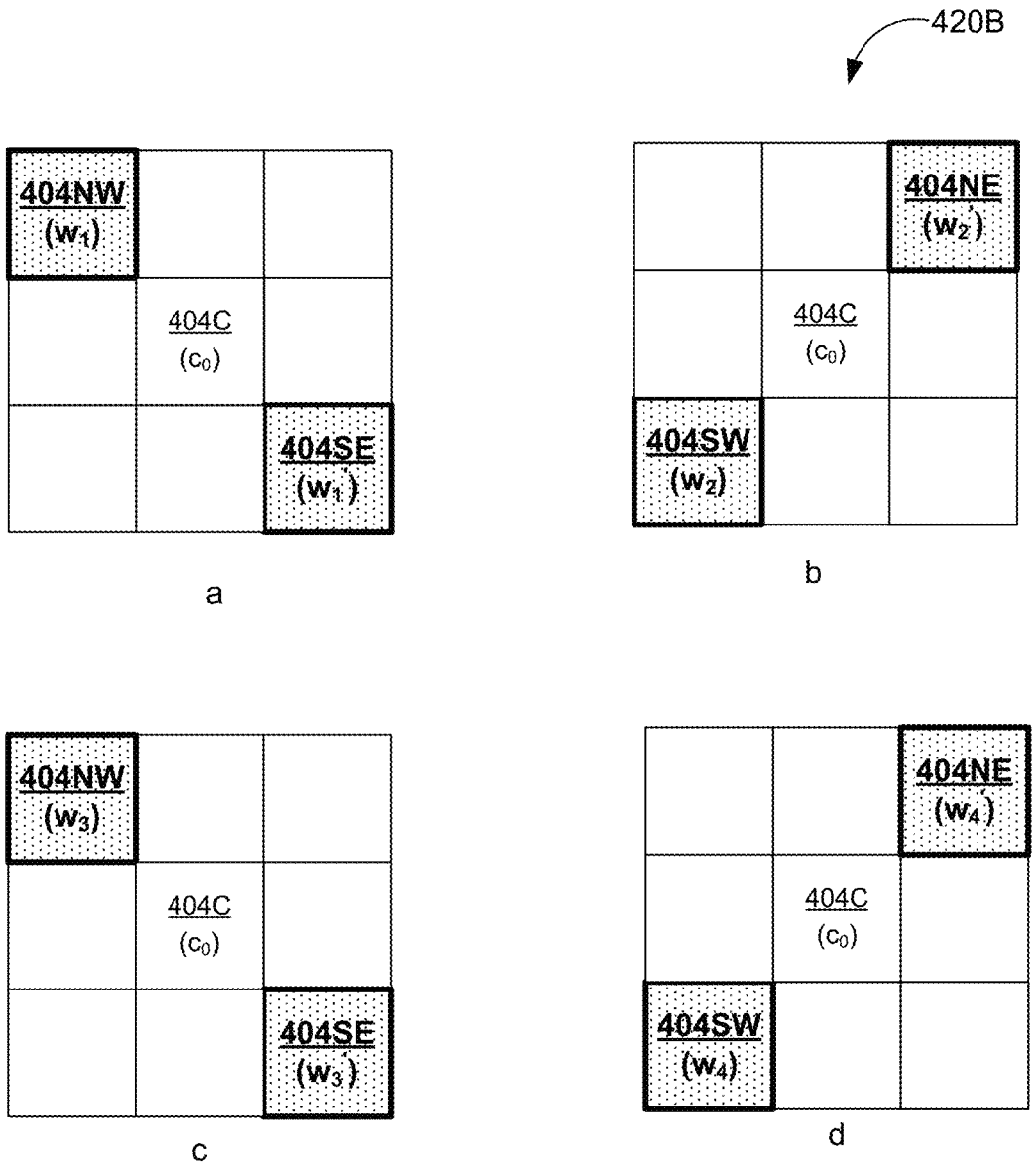
Figure 4C:
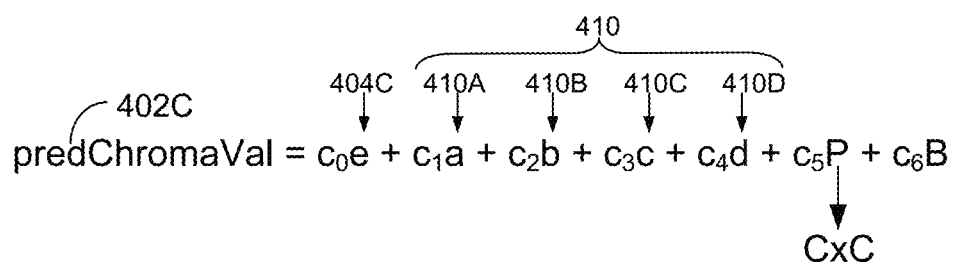

FIG. 4A illustrates an example scheme 400 for generating a first chroma sample 402C from a plurality of luma samples 404C and 404X in an MH-CCP mode, in accordance with some embodiments, and FIGS. 4B and 4C are schematic diagrams of two example hypothesis tap combinations 420A and 420B including four neighboring luma samples 404X of a first luma sample 404C, in accordance with some embodiments, respectively. In some embodiments, a current coding block 406A of a current image frame 408 is coded in a cross-component intra prediction (CCIP) mode. In the CCIP mode, a decoder 122 (FIG. 2B) determines each chroma sample 402 of the current coding block 406A based on one or more luma samples 404 that have been reconstructed. In some situations, the CCIP mode includes a cross-component linear model mode (CCLM) in which a first chroma sample 402C is converted from a reconstructed luma sample 404C that is co-located with the chroma sample based on a linear model. Alternatively, in some situations, the CCIP mode includes a convolutional cross-component mode (CCCM) in which a first chroma sample 402C is predicted directly from a plurality of reconstructed luma samples 404X that is located adjacent to the first luma sample 404C based on a filter shape of a filter. Alternatively and additionally, in some situations, the CCIP mode includes the MH-CCP mode in which a first chroma sample 402C is generated by combining at least the first luma sample 404C that is co-located with the first chroma sample 402C and a plurality of hypothesis values 410 using a plurality of weighing factors (e.g., $c_0$-$c_6$). The plurality of neighboring luma samples 404X of the first luma sample 404C are combined using a plurality of coefficients to generate the plurality of hypothesis values 410.

In some embodiments, the plurality of neighboring luma samples 404X includes a north neighboring luma sample (also called an above luma sample) 400N, a south neighboring luma sample (also called a below luma sample) 400S, a west neighboring luma sample (also called a left luma sample) 400W, and an east neighboring luma sample (also called a right luma sample) 400E. Further, referring to FIG. 4B, in some embodiments, the north neighboring luma sample 404N and the south neighboring luma sample 404S are combined to generate a first subset of one or more hypothesis values 410A and 410C. The west neighboring luma sample 404W and the east neighboring luma sample 404E are combined to generate a second subset of one or more hypothesis values 410B and 410D. For example, the north neighboring luma sample 404N and the south neighboring luma sample 404S are combined to generate a first hypothesis value 410A (a) and a third hypothesis value 410C (c), and the west neighboring luma sample 404W and the east neighboring luma sample 404E are combined to generate a second hypothesis value 410B (b) and a fourth hypothesis value 410D (d). Specifically, the four hypothesis values 410 are represented as follows:

$$a = w1 * N + w1' * S \quad (1)$$
$$b = w2 * W + w2' * E \quad (2)$$
$$c = w3 * N + w3' * S \quad (3)$$
$$d = w4 * W + w4' * E \quad (4)$$

where a, b, c, d, are e are the hypothesis values 410A, 410B, 410C, and 410D, respectively; and N, W, S, and E are luma values of the neighboring luma samples 404N, 404W, 404S, and 404E, respectively; and w1, w1', w2, w2', w3, w3', w4, and w4' are coefficients used to combine the neighboring luma samples 404X to generate the hypothesis values 410. In an example, w1 and w1' are equal to 1; w2 and w2' are equal to 1; w3 and w3' are equal to 1 and −1, respectively; and w4 and w4' are equal to 1 and −1, respectively. In some embodiments, each of equations (1)-(4) is normalized. A sum of absolution values of w1 and w1', a sum of absolution values of w2 and w2', a sum of absolution values of w3 and w3', and a sum of absolution values of w4 and w4' are equal to 1.

In accordance with a determination that the MH-CCP mode is applied, the first chroma sample 402 is predicted according to one of the following equations:

$$predChromaVal = c_0e + c_1a + c_2b + c_3c + c_4d \quad (5.1)$$
$$predChromaVal = c_0e + c_1a + c_2b + c_3c + c_4d + c_5P \quad (5.2)$$
$$predChromaVal = c_0e + c_1a + c_2b + c_3c + c_4d + c_6B \quad (5.3)$$
$$predChromaVal = c_0e + c_1a + c_2b + c_3c + c_4d + c_5P + c_6B \quad (5.4)$$

where predChroma Val is a predicted chroma value of the first chroma sample 402C; e is a luma value of the first luma sample 404C that is co-located with the first chroma sample 402C; P is a non-linear term, e.g., equal to (C*C+a median luma value)>>bitdepth; B is an offset; and $c_0$-$c_6$ are weighing factors. In some embodiments (e.g., in equation (5.1)), the non-linear term P and the offset B are not applied to predict the first chroma sample 402C. Alternatively, in some embodiments (e.g., in equation (5.2) or (5.3)), only one of the non-linear term P and the offset B is applied to predict the first chroma sample 402C. Alternatively, in some embodiments (e.g., in equation (5.4)), both the non-linear term P and the offset B are applied to predict the first chroma sample 402C. In some embodiments, B is a median luma value or an average luma value of the luma samples 404 of the current coding block 406A.

In some embodiments, the plurality of weighing factors $c_0$-$c_6$ are determined based on a set of one or more reference luma samples 404R and a set of one or more co-located reference chroma samples 402R within a reference area 412 of the current coding block 406A. The reference area 412 is located in the current image frame 408. Further, in some embodiments, the reference luma samples 404R of the reference area 412 are used to generate corresponding reference hypothesis values based on equations (1)-(4), which are further combined to re-generate one or more chroma samples based on any of equations (5.1)-(5.4). In some embodiments, the set of one or more co-located reference chroma samples 402R and the one or more re-generated chroma samples are compared to generate a least mean square (LMS) value. The plurality of weighing factors $c_0$-$c_6$ are iteratively adjusted to reduce the LMS value, until the LMS value satisfies a predefined criterion (e.g., in which the LMS value is below a threshold LMS value or is minimized).

In some embodiments, the current image frame 408 further includes a second coding block 406B that is distinct from the current coding block 406A (also called a first coding block). The reference area of the respective coding block is identified for each of the coding blocks 406A and 406B. The reference area 412 of the second coding block 406B is distinct from the references area 412 of the first coding block 406A. In some situations, the reference area 412 of the current coding block 406A is different in size from the reference area 412 of the second coding block 406B.

In some embodiments, the plurality of neighboring luma samples 404X includes a northwest neighboring luma sample (also called a top left luma sample) 400NW, a southeast neighboring luma sample (also called a bottom right luma sample) 400SE, a southwest neighboring luma sample (also called a bottom left luma sample) 400SW, and a northeast neighboring luma sample (also called a top right luma sample) 400NE. Further, referring to FIG. 4C, in some embodiments, the northwest neighboring luma sample 404NW and the southeast neighboring luma sample 404SE are combined to generate a first subset of one or more hypothesis values. The southwest neighboring luma sample 404SW and the northeast neighboring luma sample 404NE are combined to generate a second subset of one or more hypothesis values. For example, the northwest neighboring luma sample 404NW and the southeast neighboring luma sample 404SE are combined to generate a first hypothesis value 410A (a) and a third hypothesis value 410C (c), and the southwest neighboring luma sample 404SW and the northeast neighboring luma sample 404NE are combined to generate a second hypothesis value 410B (b) and a fourth hypothesis value 410D (d). Specifically, the four hypothesis values 410 (a-d) are represented as follows:

$$a = w1*NW + w1'*SE \quad (6)$$
$$b = w2*SW + w2'*NE \quad (7)$$
$$c = w3*NW + w3'*SE \quad (8)$$
$$d = w4*SW + w4'*NE \quad (9)$$

where a, b, c, d, are e are the four hypothesis values 410A, 410B, 410C, and 410D, respectively; and NW, SW, SE, and NE are luma values of the neighboring luma samples 404NW, 404SW, 404SE, and 404NE, respectively; and w1, w1', w2, w2', w3, w3', w4, and w4' are coefficients used to combine the neighboring luma samples 404X to generate the hypothesis values 410. In an example, w1 and w1' are equal to 1; w2 and w2' are equal to 1; w3 and w3' are equal to 1 and −1, respectively; and w4 and w4' are equal to 1 and −1, respectively. In some embodiments, equations (6)-(9) are normalized. A sum of absolution values of w1 and w1', a sum of absolution values of w2 and w2', a sum of absolution values of w3 and w3', and a sum of absolution values of w4 and w4' are equal to 1. In accordance with a determination that the MH-CCP mode is applied, the first chroma sample 402C is predicted by any of equations (5.1)-(5.4).

In some embodiments, the plurality of weighing factors $c_0$-$c_6$ are determined based on a set of one or more luma samples 404 and a set of one or more co-located chroma samples 402 within a reference area 412 of the current coding block 406A. The reference area 412 is located in the current image frame 408. Further, in some embodiments, the set of one or more luma samples 404 of the reference area 412 are used to generate corresponding reference hypothesis values based on equations (1)-(4) or based on equations (6)-(9). The corresponding reference hypothesis values are further combined to generate one or more reference chroma samples based on any of equations (5.1)-(5.4). The set of one or more co-located chroma samples 402 and the one or more reference chroma samples are compared to generate an LMS value. The plurality of weighing factors $c_0$-$c_6$ are iteratively adjusted to reduce the LMS value, until the LMS value satisfies a predefined criterion (e.g., in which the LMS value is below a threshold LMS value or is minimized).

In some embodiments, the first luma sample 404C is a downsampled luma sample (when luma and chroma has different dimensions, e.g., 4:2:2 or 4:2:0) using a downsampling filter, so is each neighboring samples (e.g., N, W, E, S, NW, NE, SW, SE) used to derive the corresponding hypothesis value 410. Alternatively, in some embodiments, the first luma sample 404C is an original luma sample co-located with the first chroma sample 402C without any downsampling. Each neighboring samples (e.g., N, W, E, S, NW, NE, SW, SE) used to derive the corresponding hypothesis value 410 includes an original luma sample neighboring to the co-located luma sample without any downsampling.

In some embodiments, at least one weighing factor in $c_0$-$c_6$ is derived based on chroma samples and luma samples within the reference area 412 of the current coding block 406A, and the reference area 412 includes one or more coding blocks (e.g., 8 coding blocks in FIG. 4A) that are decoded prior to, the current coding block 406A. In some embodiments, a subset of the one or more coding blocks is immediately adjacent to the current coding block 406A. In some embodiments, a subset of the one or more coding blocks are separated from the current coding block 406A by one or more coding blocks. In some embodiments, the reference area 412 includes at least a portion of one or more rows above the current coding block 406A and/or a portion of one or more columns to the left of the current coding block 406A. For example, referring to FIG. 4A, the reference area 412 includes 7 rows of luma samples 404 above the current coding block 406A and 9 columns of luma samples 404 to the left of the current coding block 406A.

In some embodiments, the at least one weighing factor in $c_0$-$c_6$ is determined by minimising a mean square error (MSE) between predicted and reconstructed chroma samples 402 in the reference area 412. The MSE minimization is performed by calculating autocorrelation matrix for the luma samples 404 and a cross-correlation vector between the luma samples 404R and chroma samples 402R of the reference area 412. Autocorrelation matrix is processed with LDL decomposition and the plurality of weighing factors is calculated using back-substitution. The process follows roughly the calculation of filter coefficients of an adaptive loop filter (ALF) in enhanced compression model (ECM) video coding. LDL decomposition does not use square root operations and uses only integer arithmetic operations.

Referring to FIGS. 4B and 4C, each of the two example hypothesis tap combinations 420A and 420B includes four hypothesis values 410A-410D. The video bitstream 116 (FIG. 1) received by the decoder 122 includes a hypothesis tap index 414 selecting one of a plurality of hypothesis tap combinations 420 (e.g., including the two example combinations 420A and 420B in FIGS. 4A and 4B) for at least the current coding block 406A. In an example, the hypothesis tap index 414 selects the hypothesis tap combination 420A, and the plurality of neighboring luma samples 404X (e.g., 404N, 404W, 404S, and 404E) is identified based on the selected hypothesis tap combination 420A. The hypothesis values 410A-410D are generated based on the identified neighboring luma samples 404X (e.g., 404N, 404W, 404S, and 404E). In another example, the hypothesis tap index 414 selects the hypothesis tap combination 420B, and the plurality of neighboring luma samples 404X (e.g., 404NW, 404SW, 404SE, and 404NE) is identified based on the selected hypothesis tap combination 420B. The hypothesis values 410A-410D are generated based on the identified neighboring luma samples 404X (e.g., 404NW, 404SW, 404SE, and 404NE). In some embodiments, the hypothesis tap index 414 is signaled in the video bitstream 116 at one of a block level, a superblock level, an image frame level, a key frame level, and an image sequence level for the current coding block 406A.

In some embodiments, the plurality of hypothesis tap combinations 420 does not include one or both of the combination 420A and 420B. In some embodiments, the plurality of hypothesis tap combinations 420 includes one or more additional hypothesis tap combinations that are different from the combinations 420A and 420B. Further, in some embodiments, each combination 420A or 420B includes four hypothesis taps. Conversely, an additional hypothesis tap combination includes the same number (i.e., 4) or a different number (e.g., 2, 8) of hypothesis values. More details on hypothesis values, taps, and associated combinations are explained below with reference to FIGS. 5A-5D and 6A-6D.

Figure 5A:
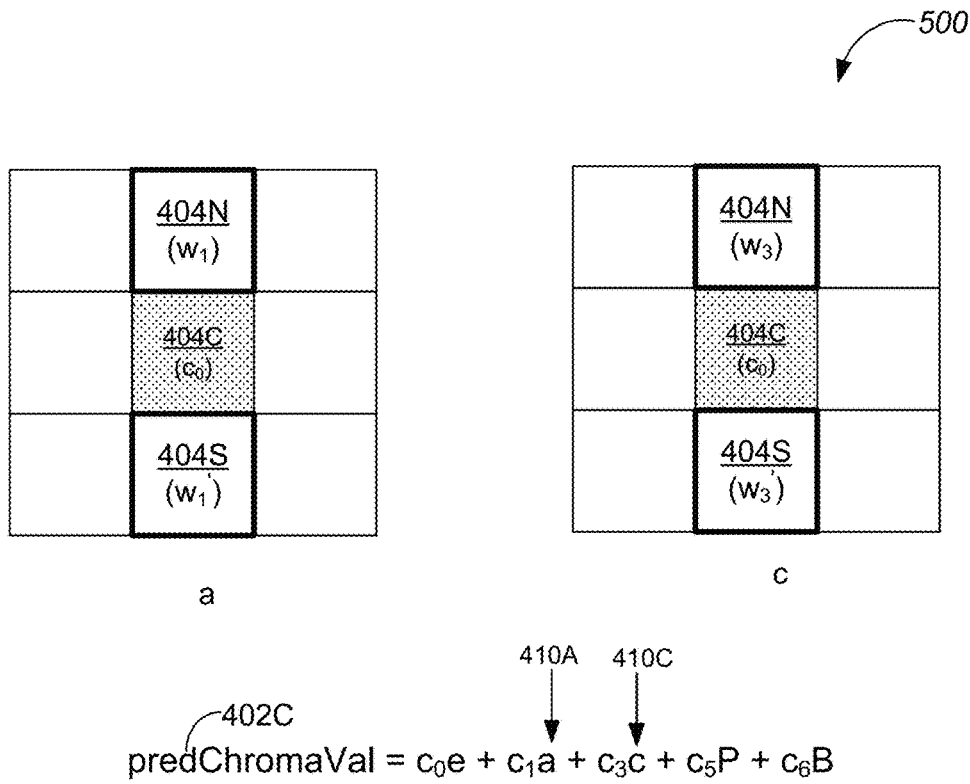
FIGS. 5A-5D are schematic diagrams of four example hypothesis tap combinations each of which is generated from two neighboring luma samples immediately adjacent to a first luma sample, in accordance with some embodiments.
Figure 5B:
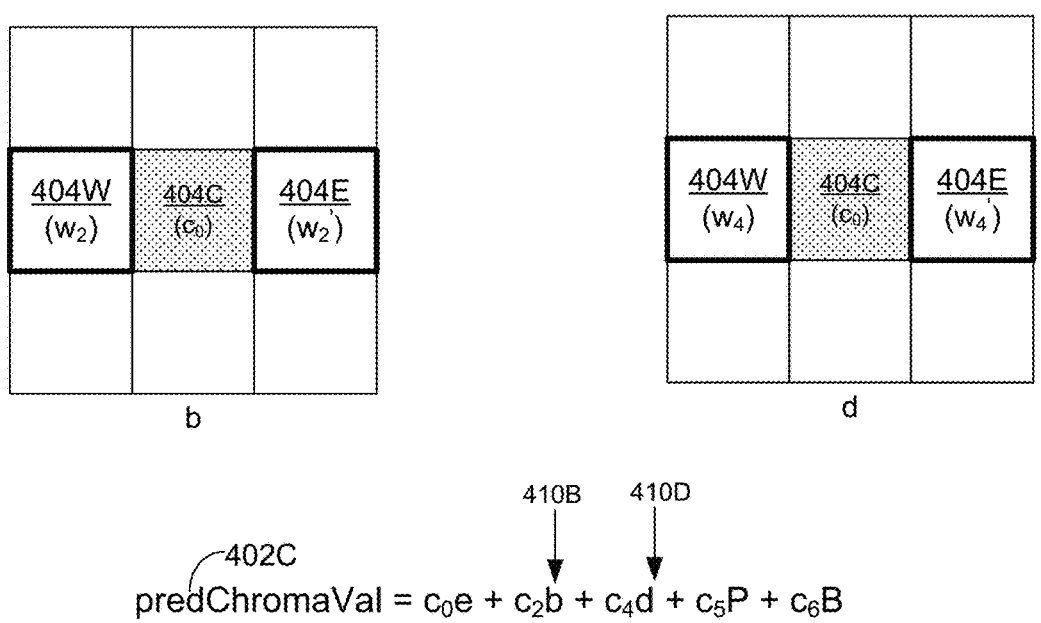
Figure 5C:
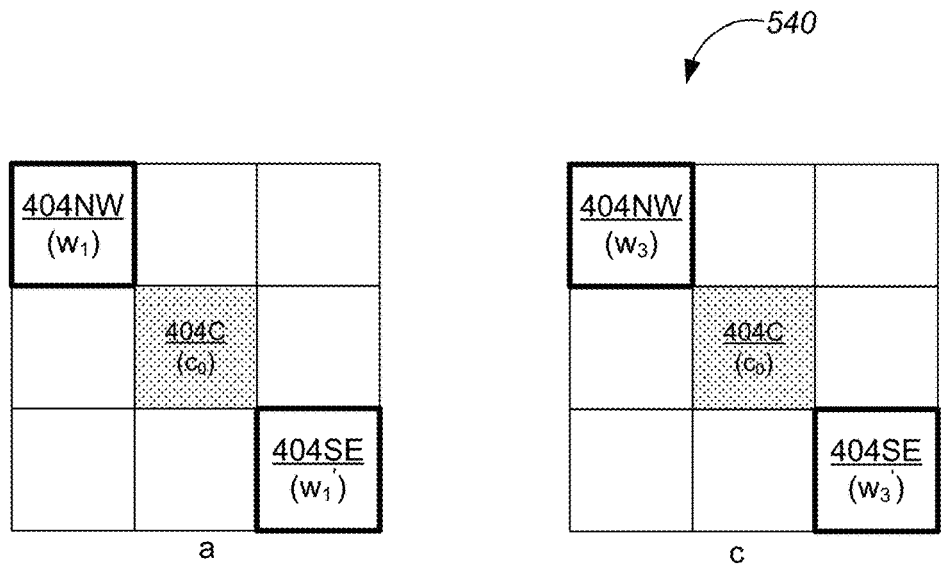
Figure 5D:
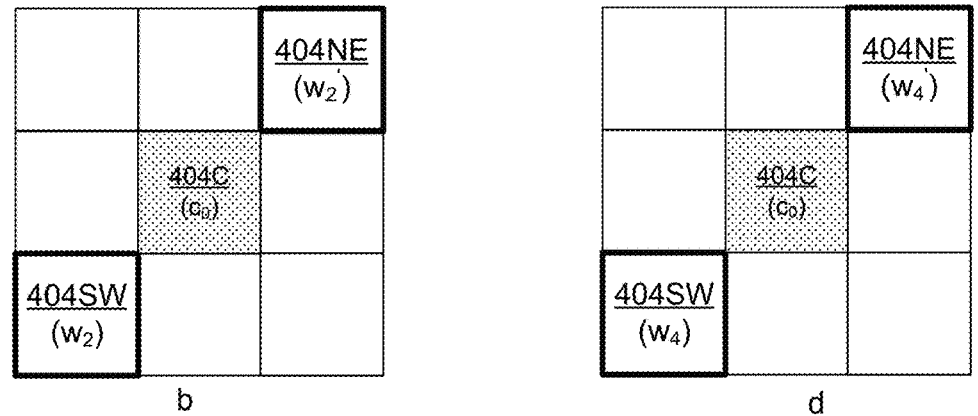

FIGS. 5A-5D are schematic diagrams of four example hypothesis tap combinations each of which is generated from two neighboring luma samples immediately adjacent to a first luma sample, in accordance with some embodiments. FIG. 5A is a schematic diagram of a hypothesis tap combination 500 including a north neighboring luma sample 404N and a south neighboring luma sample 404S, in accordance with some embodiments; FIG. 5B is a schematic diagram of another hypothesis tap combination 520 including a west neighboring luma sample 404W and an east neighboring luma sample 404E, in accordance with some embodiments; FIG. 5C is a schematic diagram of another hypothesis tap combination 540 including a northwest neighboring luma sample 404NW and a southeast neighboring luma sample 404SE, in accordance with some embodiments; and FIG. 5D is a schematic diagram of another hypothesis tap combination 560 including a southwest neighboring luma sample 404SW and a northeast neighboring luma sample 404NE, in accordance with some embodiments. A current coding block 406A of a current image frame 408 includes a first chroma sample 402C, a first luma sample 404C co-located with the first chroma sample 402C, and a plurality of neighboring luma samples 404X (e.g., 404N, 404S, 404W, 404S, 404NW, 404NE, 404SW, and 404SE) of the first luma sample 404C. The plurality of neighboring luma samples 404X of the first luma sample 404C are combined using a plurality of coefficients to generate the plurality of hypothesis values 410, which are further combined to generate the first chroma sample 402C that is co-located with the first luma sample 404C. In some embodiments (e.g., in FIG. 4A), the plurality of neighboring luma samples 404X include four neighboring luma samples 404X that are combined to generate four hypothesis values 410 applied to generate the first chroma sample 402C. Referring to FIGS. 5A-5D, each hypothesis tap combination includes two hypothesis values 410 that are generated from two neighboring luma samples 404X.

Specifically, in some embodiments, the plurality of neighboring luma samples 404X includes a first neighboring luma sample (e.g., 404N) and a second neighboring luma sample (e.g., 404S), and a first location of the first neighboring luma sample (e.g., 404N) and a second location of the second neighboring luma sample (e.g., 404S) are symmetric with respect to a location of the first luma sample 404C. Further, in some embodiments, the first neighboring luma sample (e.g., 404N) and the second neighboring luma sample (e.g., 404S) are combined to generate a first hypothesis value (e.g., 410A in FIG. 5A) and a second hypothesis value (e.g., 410C in FIG. 5A). Additionally, in some embodiments, the first neighboring luma sample (e.g., 404N) and the second neighboring luma sample (e.g., 404S) are combined in a weighted manner using a first coefficient (e.g., w1) and a second coefficient (e.g., w1') to generate the first hypothesis value (e.g., 410A in FIG. 5A). The first neighboring luma sample (e.g., 404N) and the second neighboring luma sample (e.g., 404S) are combined in a weighted manner using a third coefficient (e.g., w3) and a fourth coefficient (e.g., w3') to generate the second hypothesis value (e.g., 410C in FIG. 5A). The first coefficient is equal to the third coefficient, and the second coefficient is opposite to the fourth coefficient. Further, in some embodiments, the first and second coefficients are normalized (e.g., their associated magnitudes have a sum of 1), and the third and fourth coefficients are normalized (e.g., their associated magnitudes have a sum of 1).

Referring to FIG. 5A, in some embodiments, the first and second neighboring luma samples include the north neighboring luma sample 404N and the south neighboring luma sample 404S. The luma samples 404N and 404S are used to generate two hypothesis values 410A and 410C (i.e., a and c), which are further combined with the first luma sample 404C in a weighted manner to generate the first chroma sample 402C according to one of the following equations:

$$predChromaVal = c_0 e + c_1 a + c_3 c \qquad (10.1)$$

$$predChromaVal = c_0 e + c_1 a + c_3 c + c_5 P \qquad (10.2)$$

$$predChromaVal = c_0 e + c_1 a + c_3 c + c_6 B \qquad (10.3)$$

$$predChromaVal = c_0 e + c_1 a + c_3 c + c_5 P + c_6 B \qquad (10.4)$$

As such, in some embodiments, the hypothesis tap index 414 (FIG. 4A) selects the hypothesis tap combination 500. This selected hypothesis tap combination 500 corresponds to the first luma sample 404C, a north luma sample 404N located immediately above the first luma sample 404C, and a south luma sample 404S located immediately below the first luma sample 404C.

Referring to FIG. 5B, in some embodiments, the west neighboring luma sample 404W and the east neighboring luma sample 404E are used to generate two hypothesis values 410B and 410D (i.e., b and d), which are further combined with the first luma sample 404C in a weighted manner to generate the first chroma sample 402C according to one of the following equations:

$$predChromaVal = c_0 e + c_2 b + c_4 d \qquad (11.1)$$

$$predChromaVal = c_0 e + c_2 b + c_4 d + c_5 P \qquad (11.2)$$

$$predChromaVal = c_0 e + c_2 b + c_4 d + c_6 B \qquad (11.3)$$

$$predChromaVal = c_0 e + c_2 b + c_4 d + c_5 P + c_6 B \qquad (11.4)$$

As such, in some embodiments, the hypothesis tap index 414 (FIG. 4A) selects the hypothesis tap combination 520. This selected hypothesis tap combination corresponds to the first luma sample 404C, a west luma sample 404W located immediately to the left of the first luma sample 404C, and an east luma sample 404E located immediately to the right of the first luma sample 404C.

Referring to FIG. 5C, in some embodiments, the northwest neighboring luma sample 404NW and the southeast neighboring luma sample 404SE are used to generate two hypothesis values 410A and 410C, which are further combined with the first luma sample 404C in a weighted manner to generate the first chroma sample 402C according to any of equations (10.1)-(10.4). Referring to FIG. 5D, in some embodiments, the southwest neighboring luma sample 404SW and the northeast neighboring luma sample 404NE are used to generate two hypothesis values 410B and 410D, which are further combined with the first luma sample 404C in a weighted manner to generate the first chroma sample 402C according to any of equations (11.1)-(11.4).

In some embodiments, based on a plurality of weighing factors (e.g., $c_0$-$c_6$), the first luma sample 404C and the plurality of hypothesis values 410 are combined with at least one of (1) a non-linear term P of a subset of the first luma sample 404C and the plurality of neighboring luma samples 404X and (2) a bias term B. Further, in some embodiments, the subset of the first luma sample 404C and the plurality of neighboring luma samples 404X includes only the first luma sample 404C. The non-linear term P is determined based on the first luma sample 404C. In an example, the non-linear term P is equal to a square of a luma value of the first luma sample 404C. Further, in some embodiments, the bias term B is determined based on at least one of (i) a median value of a set of luma samples 404 of the current coding block 406A and (2) an average of the set of luma samples 404 of the current coding block 406A. The set of luma samples 404 optionally includes all luma samples that have been reconstructed for the current coding block 406A. The set of luma samples 404 optionally includes less than all of the luma samples that have been reconstructed for the current coding block 406A.

In some embodiments, the north neighboring luma sample 404N is located immediately above the first luma sample 404C, and the south neighboring luma sample 404S is located immediately below the first luma sample 404C. In some embodiments, the west neighboring luma sample 404W is located immediately to the left of the first luma sample 404C, and the east neighboring luma sample 404E is located immediately to the right the first luma sample 404C. In some embodiments, a pixel box corresponding to the north west neighboring luma sample 404NW is connected to a left top corner of a pixel box corresponding to the first luma sample 404C, and a pixel box corresponding to the southeast neighboring luma sample 404SE is connected to a right bottom corner of the pixel box corresponding to the first luma sample 404C. In some embodiments, a pixel box corresponding to the southwest neighboring luma sample 404SW is connected to a left bottom corner of a pixel box corresponding to the first luma sample, and a pixel box corresponding to the northeast neighboring luma sample 404NE is connected to a right top corner of the pixel box corresponding to the first luma sample 404C.

FIGS. 6A-6D is a schematic diagram of four example hypothesis tap combination sets 600, 620, 640, and 660 from each of which a target hypothesis tap combination is selected based on a hypothesis tap index 414, in accordance with some embodiments. A video bitstream 116 (FIG. 1) received by a decoder 122 includes a hypothesis tap index 414 selecting one of a plurality of hypothesis tap combinations 420 for at least the current coding block 406A. Stated another way, the plurality of hypothesis tap combinations 420 forms a hypothesis tap combination set from which a target hypothesis tap combination is selected based on a hypothesis tap index 414. The target hypothesis tap combination is used to generate a plurality hypothesis values 410 from neighboring luma samples 404X of a first luma sample 404C, and a first chroma sample 402C co-located with the first luma sample 404 based on the first luma sample 404C and the hypothesis values 410. In some embodiments, the hypothesis tap index 414 is signaled in the video bitstream 116 at one of a block level, a superblock level, an image frame level, a key frame level, and an image sequence level for the current coding block 406A. While the decoder 122 receives the hypothesis tap index 414, the hypothesis tap combination set is stored memory associated with the decoder 122 and known to the decoder 122. In some embodiments, the hypothesis tap combination set is communicated for a GOP. Alternatively, in some embodiments, the hypothesis tap combination set is predefined for the decoder 122 and encoder 106.

Figure 6A:
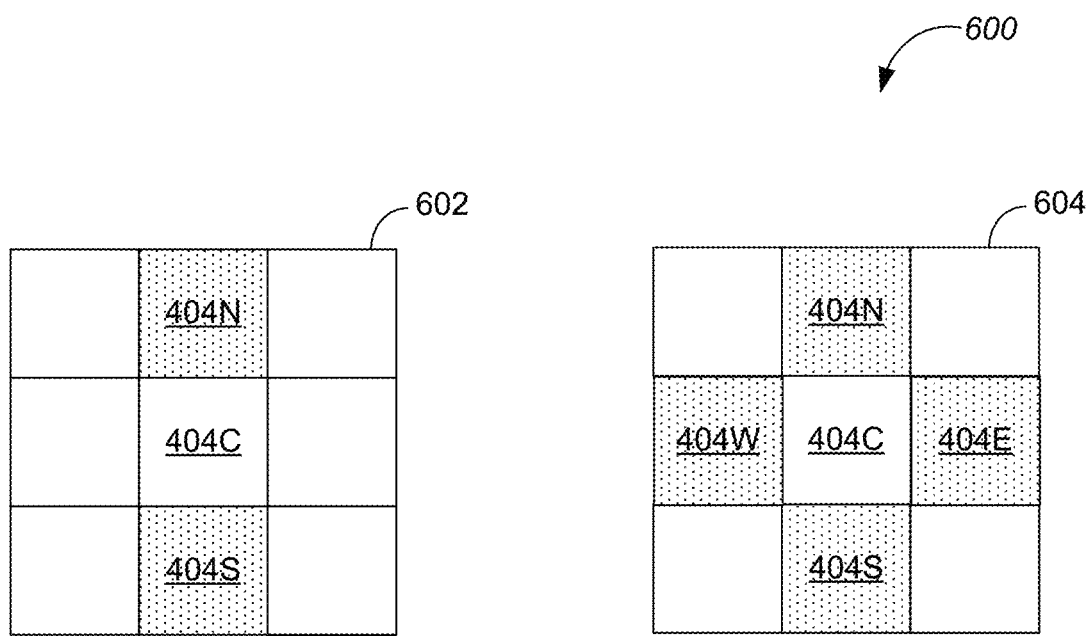
FIGS. 6A-6D is a schematic diagram of four example hypothesis tap combination sets from each of which a target hypothesis tap combination is selected based on a hypothesis tap index, in accordance with some embodiments.

Referring to FIG. 6A, in some embodiments, the first luma sample 404C is surrounded by eight closest luma sample candidates 404N, 404W, 404S, 404E, 404NW, 404NE, 404SW, and 404SE. The plurality of hypothesis tap combinations 420 includes a first hypothesis tap combination 602 corresponding to the first luma sample 404C and two neighboring luma samples 404X selected from the eight closest luma sample candidates, and a second hypothesis tap combination 604 corresponding to the first luma sample 404C and four neighboring luma samples 404X selected from the eight closest luma sample candidates. For example, the first hypothesis tap combination 602 includes one of the hypothesis tap combinations 500, 520, 540, and 560. Two hypothesis values 410 are generated, and combined with the first luma sample 404C in a weighted manner to generate the first chroma sample 402C according to any of equations (10.1)-(10.4) and (11.1)-(11.4). The second hypothesis tap combination 604 includes one of the hypothesis tap combinations 420A and 420B. Four hypothesis values 410 are generated, and combined with the first luma sample 404C in a weighted manner to generate the first chroma sample 402C according to any of equations (5.1)-(5.4).

Figure 6B:
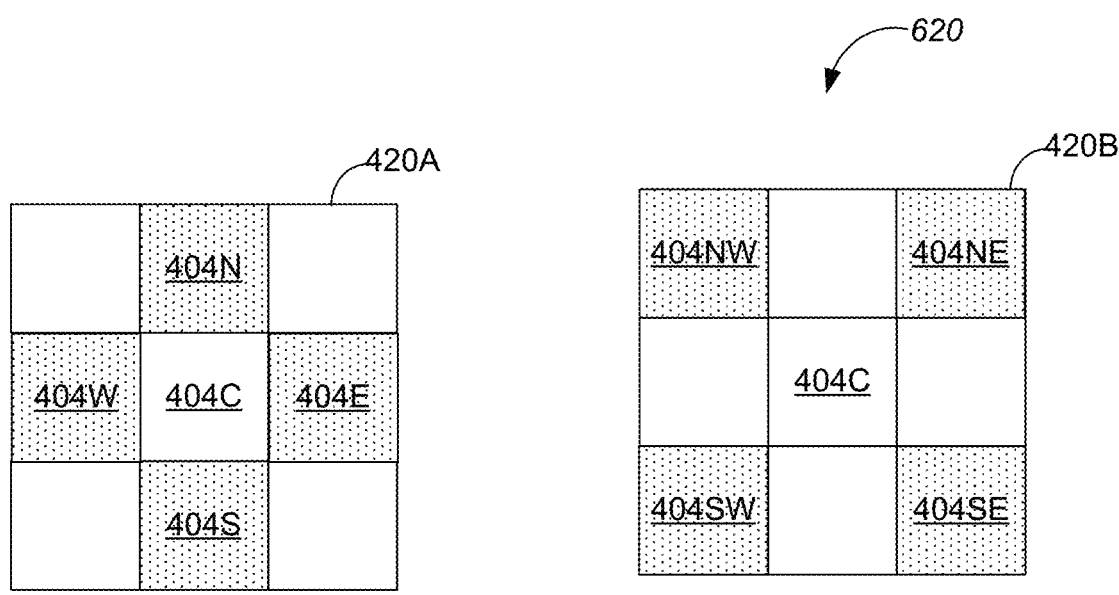

Referring to FIG. 6B, in some embodiments, the plurality of hypothesis tap combinations 420 includes a first hypothesis tap combination 420A (FIG. 4B) corresponding to the first luma sample 404C, a north luma sample 404N, a south luma sample 404S, a west luma sample 404W, and an cast luma sample 404S; and a second hypothesis tap combination 420B (FIG. 4C) corresponding to the first luma sample 404C, a northwest luma sample 404NW, a northeast luma sample 404NE, a southwest luma sample 404SW, and a southeast luma sample 404SE. Both hypothesis tap combinations 420A and 420B include four neighboring luma samples 404X that located at different locations.

Figure 6C:
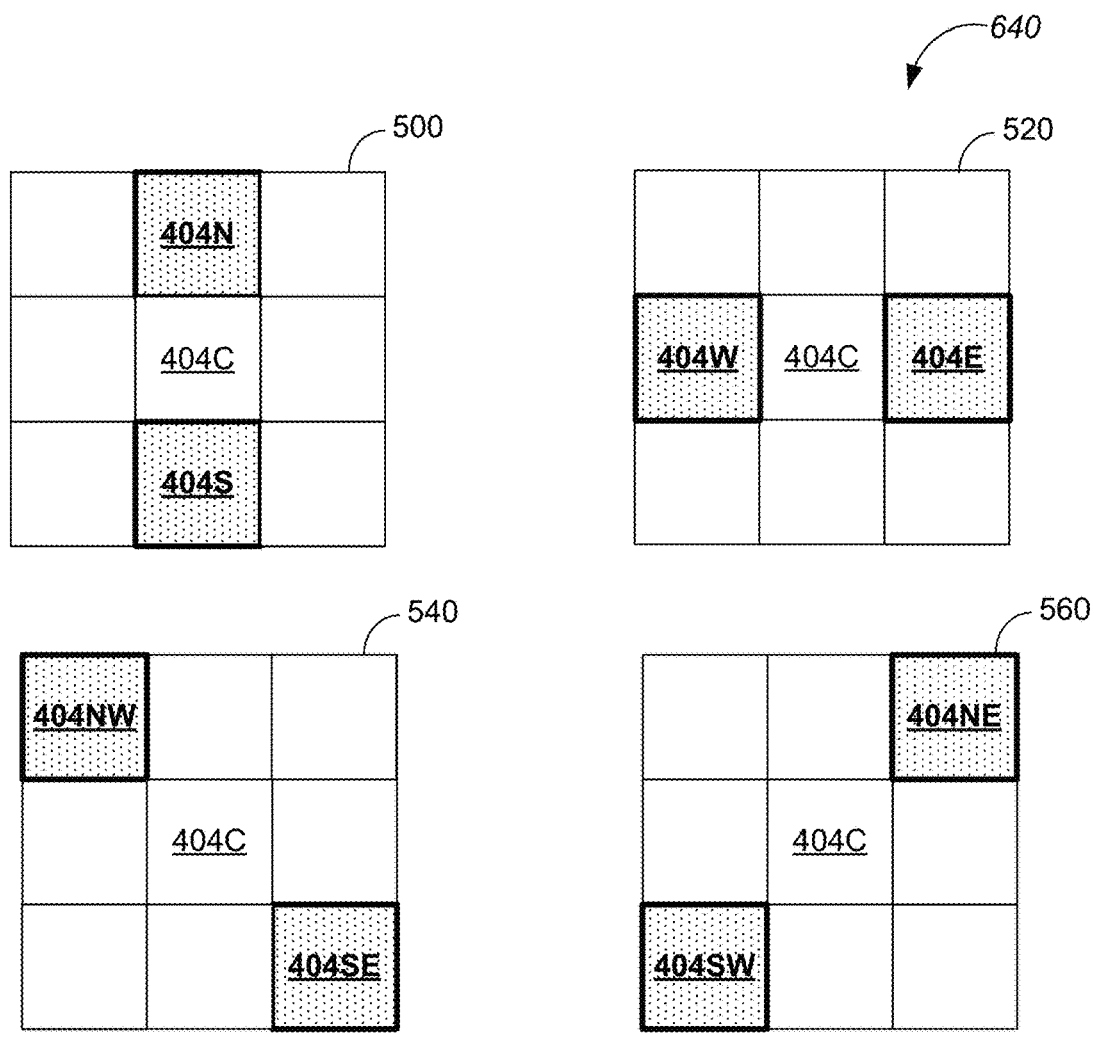

Referring to FIG. 6C, the plurality of hypothesis tap combinations 420 includes at least four hypothesis tap combinations 500, 520, 540, and 560. A first hypothesis tap combination 500 corresponds to the first luma sample 404C, a north luma sample 404N located immediately above the first luma sample 404C, and a south luma sample 404S located immediately below the first luma sample 404C. A second hypothesis tap combination 520 corresponds to the first luma sample 404C, a west luma sample 404W located immediately to the left of the first luma sample 404C, and an cast luma sample 404E located immediately to the right of the first luma sample 404C. A third hypothesis tap combination 540 corresponds to the first luma sample 404C, a northwest (NW) luma sample 404NW, and a southeast (SE) luma sample 404SE. Locations of the northwest (NW) luma sample 404NW and the southeast (SE) luma sample 404SE are symmetric with respect to a location of the first luma sample 404C. A fourth hypothesis tap combination 560 corresponds to the first luma sample 404C, a southwest (SW) luma sample 404SW, and a northeast (NE) luma sample 404NE. Locations of the southwest (SW) luma sample 404SW and the northeast (NE) luma sample 404NE are symmetric with respect to the location of the first luma sample 404C. For each of the combinations 500, 520, 540, and 560, four hypothesis values 410 are generated, and combined with the first luma sample 404C in a weighted manner to generate the first chroma sample 402C according to any of equations (10.1)-(10.4) and (11.1)-(11.4).

Figure 6D:
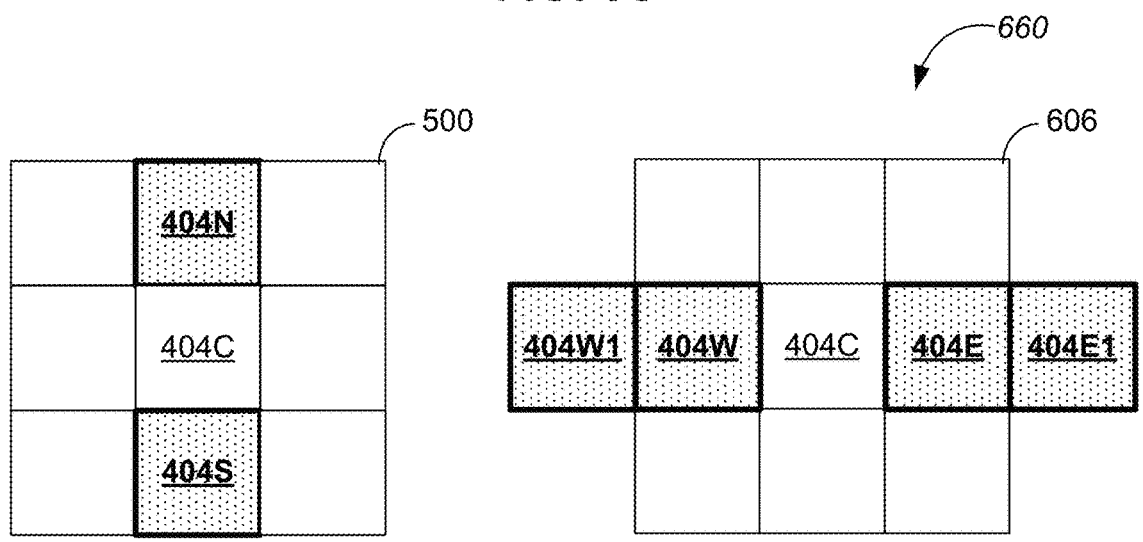

Referring to FIG. 6D, the plurality of hypothesis tap combinations 420 includes at least two hypothesis tap combinations 500 and 606. A first hypothesis tap combination 500 corresponds to the first luma sample 404C, a north luma sample 404N located immediately above the first luma sample 404C, and a south luma sample 404S located immediately below the first luma sample 404C. A second hypothesis tap combination 606 corresponds to the first luma sample 404C, two or more west luma samples (e.g., 404W, 404W1) located immediately to the left of the first luma sample 404C, and two or more east luma sample (e.g., 404E, 404E1) located immediately to the right of the first luma sample 404C. One of the combinations 500 and 606 is selected, and two or four hypothesis values 410 are generated, and combined with the first luma sample 404C in a weighted manner to generate the first chroma sample 402C.

Figure 7A:
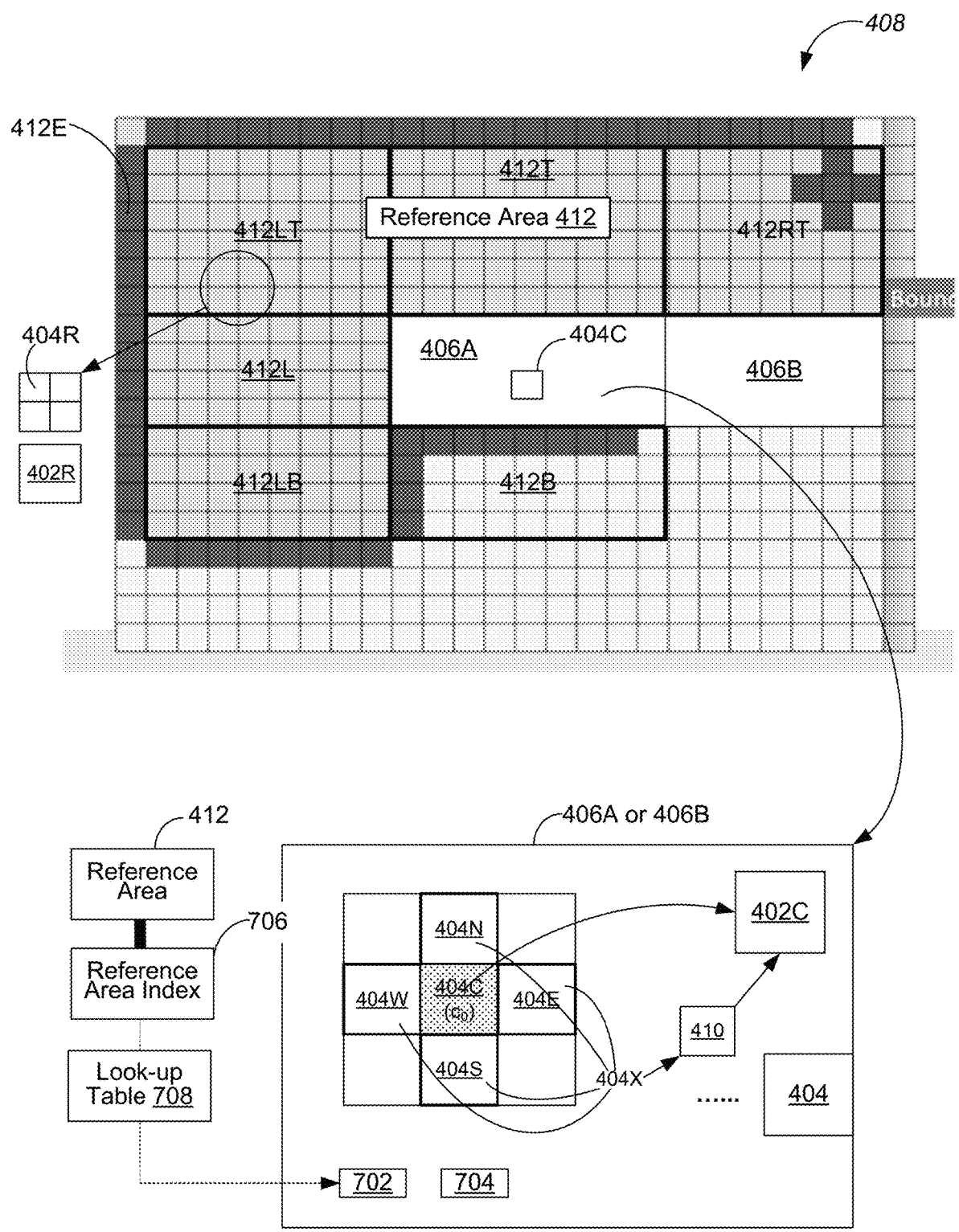
FIG. 7A is a diagram illustrating an example current image frame in which a first coding block has a reference area, in accordance with some embodiments.
Figure 7B:
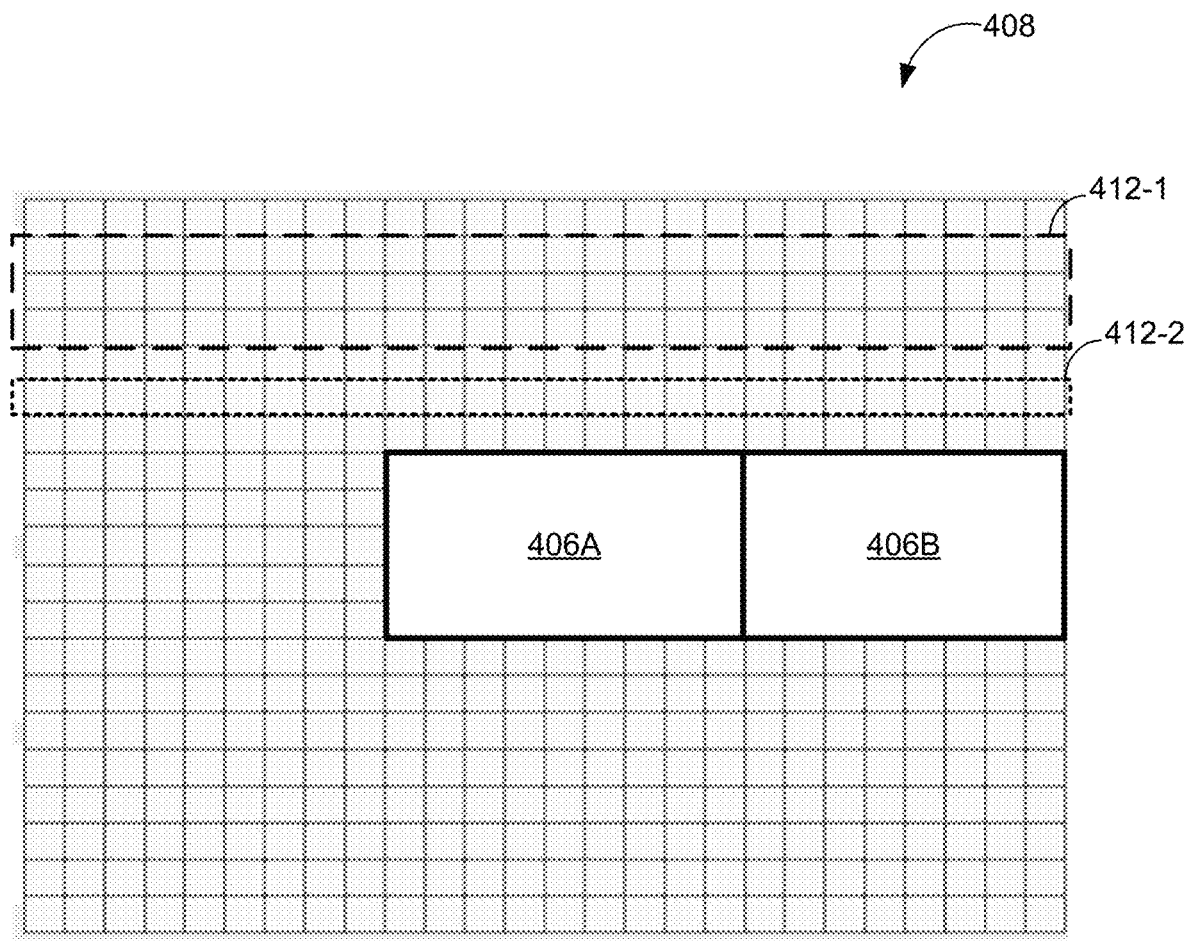
FIG. 7B is a diagram illustrating two example coding blocks and associated reference areas, in accordance with some embodiments.

FIG. 7A is a diagram illustrating a current image frame 408 in which a first coding block 406A has a reference area 412, in accordance with some embodiments. FIG. 7B is a diagram illustrating two coding blocks 406A and 406B and associated reference areas 412-1 and 412-2, in accordance with some embodiments. The reference area 312 includes reference samples 402R and 404R that are used to determine weighing factors (e.g., $c_0$-$c_6$) of the first coding block 406A. Specifically, a decoder 122 receives a video bitstream 116 including a first coding block 406A and a second coding block 406B of a current image frame 408. The video bitstream 116 includes a syntax element for a cross-component intra prediction (CCIP) mode indicating whether each chroma sample 402C of the first coding block 406A and the second coding block 406B is determined based on one or more luma samples 404C and 404X. For each of the first coding block 406A and the second coding block 406B. The decoder 122 identifies a first luma sample 404C, a first chroma sample 402C that is co-located with the first luma sample 404C in the respective coding block 406A or 406B, and a plurality of neighboring luma samples 404X of the first luma sample 404C. A plurality of hypothesis values 410 is generated based on the plurality of neighboring luma samples 404X of the first luma sample 402C. The decoder 122 identifies a reference area 412 of the respective coding block 406A or 406B, determines a plurality of weighing factors based on a set of one or more reference samples 402R and 404R in the reference area 412, and combines the first luma sample 404C and the plurality of hypothesis values 410 based on the plurality of weighing factors to generate the first chroma sample 402C. The decoder 122 reconstructs the current image frame 408 including the first chroma sample 402C of each of the first coding block 406A and the second coding block 406B.

The reference area 412 of the first coding block 406A is different in size from the reference area 412 of the second coding block 406B. For example, the reference area 412 of the second coding block 406B includes a reference region 412B, which is not included in the reference area 412 of the first coding block 406A.

In some embodiments, for each of the first coding block 406A and the second coding block 406B, the reference area 412 includes one or more coding blocks that are adjacent to, and decoded prior to, the respective coding block. In some embodiments, the one or more coding blocks are immediately adjacent to the current coding block 406. In some embodiments, the one or more coding blocks are separated from the current coding block 406 by one or more coding blocks.

Additionally, in some embodiments, the reference area 412 of the first coding block 406A includes one or more of: a top left reference region 412TL, a top reference region 412T, a top right reference region 412TR, a bottom left reference region 412BL, and a left reference region 412L. In an example, the reference area 412 includes the top reference region 412T and the left reference region 412L. Each of the reference region includes one or more coding blocks. Stated another way, in some embodiments, the reference area 412 includes at least a portion of a plurality of rows above the current coding block 406 and/or a portion of a plurality of columns to the left of the current coding block 406. For example, referring to FIG. 7A, the reference area 412 includes a first portion of 7 rows of chroma samples above the current coding block 406 and a second portion 9 columns of chroma samples to the left of the current coding block 406. The first portion is determined by a length of the current coding block 406, and the second portion is determined by a width of the current coding block 406. In some embodiments, the reference area 412 extends one coding block width to the right of a right boundary of the current coding block 406, and one coding block height below a bottom boundary of the current coding block 406. In some embodiments, the reference area 412 is adjusted to include only available samples. Extensions 412E to the reference area 412 are needed to support side samples of the cross-shaped spatial filter and are padded in unavailable areas.

Referring to FIG. 7B, in some embodiments, the set of one or more reference samples in the reference area 412-1 of the first coding block 406A includes a first number 702 of lines (e.g., 3 rows) of reference samples, and the set of one or more reference samples in the reference area 412-2 of the second coding block 406B includes a second number 704 of lines (e.g., 1 row) of reference samples. In an example, the first number is not equal to the second number. In an example, the first number is equal to the second number. A line of reference samples corresponds to one of a row or a column of reference samples in the reference area 412. In some embodiments, the line of reference samples extends to cover an entire row or column of reference samples in the current image frame 408. Alternatively, the line of reference samples extends to cover an entire row or column of reference samples of a reference region (e.g., 412T), which includes a portion (less than all) of an entire row or column of reference samples in the current image frame 408. In some embodiments, the first number 702 and the second number are signaled in the video bitstream 116. In some embodiments, the first number 702 and the second number are not signaled in the video bitstream 116.

The decoder 122 determines the first number based on a subset of a block partition, a block size, a block shape, and a block resolution of the first coding block 406A, and the second number based on a subset of a block partition, a block size, a block shape, and a block resolution of the second coding block 406B.

In some embodiments, a block resolution of the first coding block 406A is greater than a resolution threshold. A block resolution of the second coding block 406B is less than the resolution threshold. The first number 702 is greater than the second number 704. Conversely, in some embodiments, a block resolution of the first coding block 406A is greater than a resolution threshold. A block resolution of the second coding block 406B is less than the resolution threshold. The first number 702 is less than the second number 704.

In some embodiments, a block size of the first coding block 406A is greater than a block size threshold. A block size of the second coding block 406B is less than the block size threshold. The first number 702 is greater than the second number 704. Conversely, in some embodiments, a block size of the first coding block 406A is greater than a block size threshold, and a block size of the second coding block 406B is less than the block size threshold. The first number 702 is less than the second number 704.

A line of reference samples corresponds to one of a row or a column of reference samples in the reference area 412. Stated another way, in some embodiments, each of the first number 702 of lines and the second number 704 of lines of reference samples includes a respective row of reference samples in the respective reference area 412. Alternatively, in some embodiments, each of the first number 702 of lines and the second number 704 of lines of reference samples includes a respective column of reference samples in the respective reference area 412.

In some embodiments, the video bitstream 116 includes a syntax element for a reference area index 706 for each of the first coding block 406A and the second coding block 406B. The decoder 122 determines the first number 702 based on the reference area index 706 of the first coding block 406A and the second number based on the reference area index of the second coding block. Further, in some embodiments, the first number 702 is determined using a look-up table based on the reference area index 706 of the first coding block 406A, and the second number 704 is determined using the look-up table based on the reference area index 706 of the second coding block 406B. In some embodiments, for each of the first coding block 406A and the second coding block 406B, the reference area index 706 is signaled in the video bitstream at one of a block level, a superblock level, an image frame level, a key frame level, and an image sequence level for the respective coding block.

In some embodiments, the decoder 122 determines the plurality of weighing factors by determining a least mean square (LMS) value based on the set of one or more reference samples and iteratively adjusting the plurality of weighing factors to reduce the LMS value until the LMS value satisfy a predefined criterion (e.g., the LMS value is minimized or below a LMS threshold).

Figure 8:
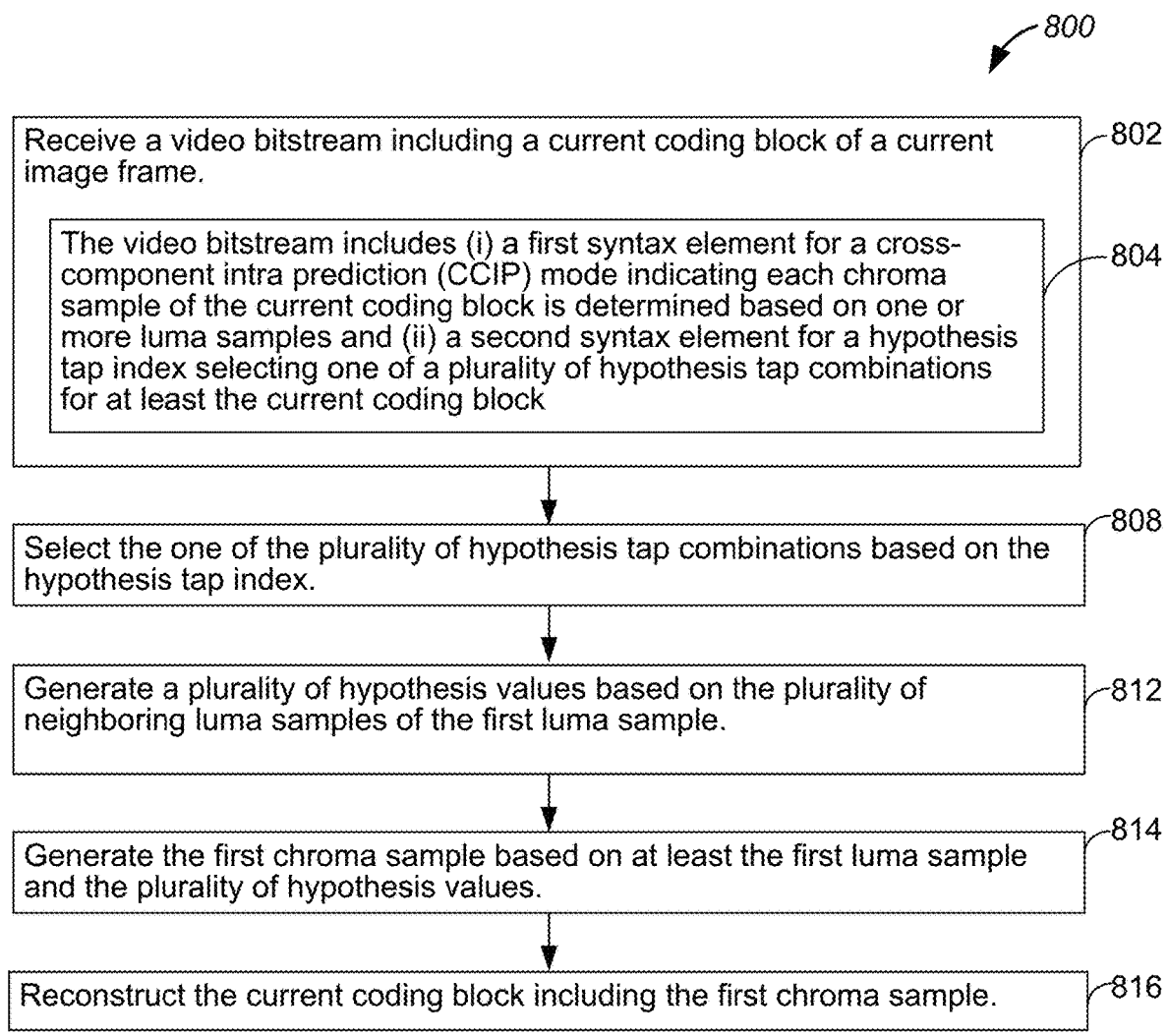
FIG. 8 is a flow diagram illustrating an example method of coding video, in accordance with some embodiments.

FIG. 8 is a flow diagram illustrating an example method 800 of coding video, in accordance with some embodiments. The method 800 may be performed at a computing system (e.g., the server system 112, the source device 102, or the electronic device 120) having control circuitry and memory storing instructions for execution by the control circuitry. In some embodiments, the method 800 is applied jointly with one or more video codecs, including but not limited to, H.264, H.265/HEVC, H.266/VVC, AV1 and AVS/AVS2/AVS3. In some embodiments, the method 800 is performed by executing instructions stored in the memory (e.g., the coding module 320 of the memory 314) of the computing system. In some embodiments, multiple combinations of the unfiltered/filtered cross-component samples are supported. As a decoder 120 receives a video bitstream 116 including a current coding block 406A of a current image frame 408, selection on which combination of the unfiltered/filtered samples is used is signaled in the video bitstream 116 (804) and parsed at the decoder 120. In one example, 3 combinations 420 of the filtered samples are supported, the first combination is {N. S}, the second combination is {W, E}, and the third combination is {N, S. W. E}. The signaling occurs at one or more of: a block level, a superblock level, a frame level, and a key frame level, and a sequence level.

In some embodiments, the selection between an M-tap linear model and an N-tap linear model (FIG. 6A) is signaled in the bitstream 116. In one example, M is equal to 3 and N is equal to 5. In some embodiments, the selection between different sets of luma samples (or filter taps) is signaled in the bitstream. In some embodiments, the selection between a first hypothesis tap combination 420A (e.g., including {N, W, S, E, C}) (FIG. 4B) and a second hypothesis tap combination 420B (e.g., including {NW, NE, SW, SE, C}) (FIG. 4C) is signaled in the bitstream 116. In some embodiments, referring to FIG. 6C, the selection among four hypothesis tap combinations 500, 520, 540, and 560 (e.g., including {N, S. C}, {W. E. C}, {NW. SE, C}, {SW, NE, C}) is signaled in the bitstream.

In some embodiments (FIGS. 5A and 5C), a, c, e, and P and B are used to derive the first chroma sample 402C according to equations (10.1)-(10.4). The signaling occurs at one or more of: a block level, a superblock level, a frame level, and a key frame level, and a sequence level. In some embodiments (FIGS. 5B and 5D), b, d, e, P and B are used to derive the chroma prediction values. The signaling occurs at one or more of: a block level, a superblock level, a frame level, and a key frame level, and a sequence level.

In some embodiments (e.g., in FIG. 6D), the filter taps/sizes can be further extended. The filter shapes can also be adjusted. For example, horizontally a five taps filter is involved to increase the performance, whereas vertically three tap filter is kept avoiding additional line buffer. This can also be signaled in the bitstream. The signaling occurs at one or more of: a block level, a superblock level, a frame level, and a key frame level, and a sequence level.

Although FIG. 8 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 800 is implemented for decoding video data. The method 800 includes receiving (802) a video bitstream including a current coding block of a current image frame, and the video bitstream includes (804) (i) a first syntax element for a cross-component intra prediction (CCIP) mode indicating whether each chroma sample of the current coding block is determined based on one or more luma samples and (ii) a second syntax element for a hypothesis tap index selecting one of a plurality of hypothesis tap combinations for at least the current coding block. The method 800 further includes selecting (808) the one of the plurality of hypothesis tap combinations based on the hypothesis tap index. The method 800 includes generating (812) a plurality of hypothesis values based on a plurality of neighboring luma samples of a first luma sample based on the selected one of the plurality of hypothesis tap combinations, generating (814) a first chroma sample co-located with the first luma sample based on at least the first luma sample and the plurality of hypothesis values, and reconstructing (816) the current coding block including the first chroma sample.

(A2) In some embodiments of A1, the hypothesis tap index is signaled in the video bitstream at one of a block level, a superblock level, an image frame level, a key frame level, and an image sequence level for the current coding block.

(A3) In some embodiments of A1 or A2, the first luma sample is surrounded by eight closest luma sample candidates, and the plurality of hypothesis tap combinations includes: a first hypothesis tap combination corresponding to the first luma sample and two neighboring luma samples selected from the eight closest luma sample candidates; and a second hypothesis tap combination corresponding to the first luma sample and four neighboring luma samples selected from the eight closest luma sample candidates.

(A4) In some embodiments of A1 or A2, the plurality of hypothesis tap combinations includes: a first hypothesis tap combination corresponding to the first luma sample, a north luma sample, a south luma sample, a west luma sample, and an cast luma sample; and a second hypothesis tap combination corresponding to the first luma sample, a northwest luma sample, a northeast luma sample, a southwest luma sample, and a southeast luma sample.

(A5) In some embodiments of A1 or A2, the plurality of hypothesis tap combinations includes: a first hypothesis tap combination corresponding to the first luma sample, a north luma sample located immediately above the first luma sample, and a south luma sample located immediately below the first luma sample; a second hypothesis tap combination corresponding to the first luma sample, a west luma sample located immediately to the left of the first luma sample, and an east luma sample located immediately to the right of the first luma sample; a third hypothesis tap combination corresponding to the first luma sample, a northwest (NW) luma sample, and a southeast (SE) luma sample, wherein locations of the northwest (NW) luma sample and the southeast (SE) luma sample are symmetric with respect to a location of the first luma sample; and a fourth hypothesis tap combination corresponding to the first luma sample, a southwest (SW) luma sample, and a northeast (NE) luma sample, wherein locations of the southwest (SW) luma sample and the northeast (NE) luma sample are symmetric with respect to the location of the first luma sample.

(A6) In some embodiments of A1 or A2, according to the hypothesis tap index, the one of the plurality of hypothesis tap combinations corresponds to the first luma sample, a north luma sample located immediately above the first luma sample, and a south luma sample located immediately below the first luma sample.

(A7) In some embodiments of A1 or A2, according to the hypothesis tap index, the one of the plurality of hypothesis tap combinations corresponds to the first luma sample, a west luma sample located immediately to the left of the first luma sample, and an cast luma sample located immediately to the right of the first luma sample.

(A8) In some embodiments of A1 or A2, the plurality of hypothesis tap combinations includes: a first hypothesis tap combination corresponding to the first luma sample, a north luma sample located immediately above the first luma sample, and a south luma sample located immediately below the first luma sample; and a second hypothesis tap combination corresponding to the first luma sample, two or more west luma samples located immediately to the left of the first luma sample, and two or more cast luma sample located immediately to the right of the first luma sample.

(A9) In some embodiments of any of A1-A8, generating the first chroma sample based on at least the first luma sample and the plurality of hypothesis values further comprises: combining the first luma sample, the plurality of hypothesis values, and at least one of (1) a non-linear term of a subset of the first luma sample and the plurality of neighboring luma samples and (2) a bias term using a plurality of weighing factors.

(A10) In some embodiments of A9, the method 800 includes determining the plurality of weighing factors based on a set of one or more luma samples and a set of one or more co-located chroma samples within a reference area of the current coding block, wherein the reference area located in the current image frame.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A10 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A10 above).

Figure 9:
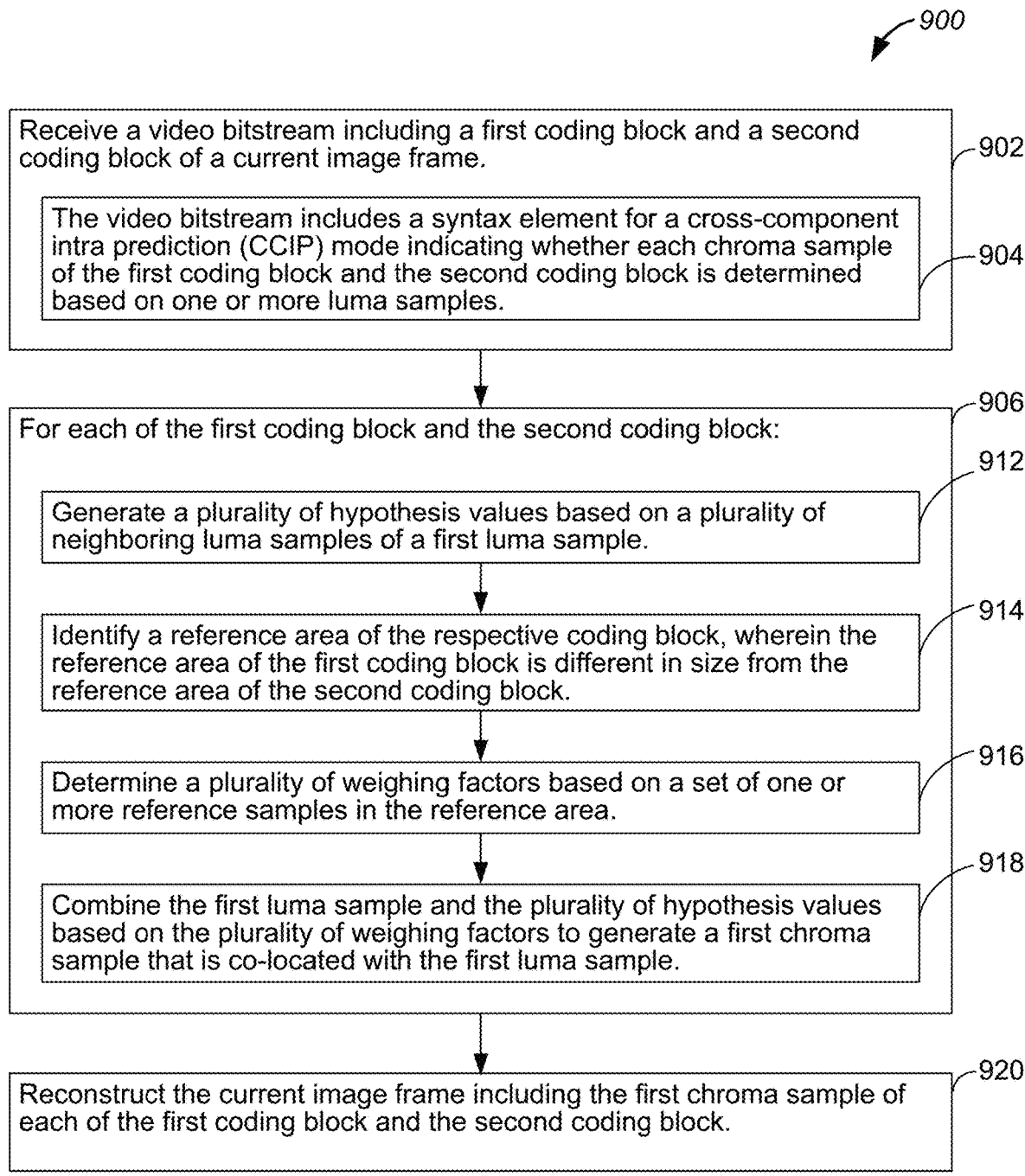
FIG. 9 is a flow diagram illustrating another example method of coding video, in accordance with some embodiments.

FIG. 9 is a flow diagram illustrating another example method 900 of coding video, in accordance with some embodiments. The method 900 may be performed at a computing system (e.g., the server system 112, the source device 102, or the electronic device 120) having control circuitry and memory storing instructions for execution by the control circuitry. In some embodiments, the method 900 is applied jointly with one or more video codecs, including but not limited to, H.264, H.265/HEVC, H.266/VVC, AV1 and AVS/AVS2/AVS3. In some embodiments, the method 900 is performed by executing instructions stored in the memory (e.g., the coding module 320 of the memory 314) of the computing system. Block level adaptive reference samples for multi-hypothesis cross-component prediction (MH-CCP) is applied. Different number of reference lines or columns are employed in MH-CCP for different coding blocks 406. For example, M lines/columns reference samples are employed in MH-CCP for a first coding block 406A, whereas N lines/columns reference samples are employed in MH-CCP for a second coding block 406B. M and N are different positive numbers.

In some embodiments, the selection of number of references lines is inferred by some coded information, for example, partition, block size, block shape, resolutions.

In some embodiments, if the resolution/block size is greater than a threshold, the more column/row are used.

In another embodiment, if the resolution/block size is smaller than a threshold, the more column/row are used.

In some embodiments, the selection of number of references lines is signaled. Several predefined numbers of column/rows are stored in a look-up table and the index of selected number is signaled. For example, there are two selections, 3 and 6, and the signaled indices 0, or 1 denotes the selection. The signaling at one or more of: a block level, a superblock level, a frame level, and a key frame level, and a sequence level.

Although FIG. 9 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(B1) In some implementations, a method 900 is implemented for decoding video data. The method 900 includes receiving (902) a video bitstream including a first coding block and a second coding block of a current image frame, wherein the video bitstream includes (904) a syntax element for a cross-component intra prediction (CCIP) mode indicating whether each chroma sample of the first coding block and the second coding block is determined based on one or more luma samples. The method further includes: for each of the first coding block and the second coding block (906), generating (912) a plurality of hypothesis values based on a plurality of neighboring luma samples of a first luma sample; identifying (914) a reference area of the respective coding block, wherein the reference area of the first coding block is different in size from the reference area of the second coding block; determining (916) a plurality of weighing factors based on a set of one or more reference samples in the reference area; and combining (918) the first luma sample and the plurality of hypothesis values based on the plurality of weighing factors to generate a first chroma sample that is co-located with the first luma sample. The method further includes (920) reconstructing the current image frame including the first chroma sample of each of the first coding block and the second coding block.

(B2) In some embodiments of B1, for each of the first coding block and the second coding block, the reference area includes one or more coding blocks that are adjacent to, and decoded prior to, the respective coding block.

(B3) In some embodiments of B1 or B2, the set of one or more reference samples in the reference area of the first coding block includes a first number of lines of reference samples, and the set of one or more reference samples in the reference area of the second coding block includes a second number of lines of reference samples, the first number not equal to the second number.

(B4) In some embodiments of B3, the method 900 further includes determining the first number based on a subset of B block partition, a block size, a block shape, and a block resolution of the first coding block; and determining the second number based on a subset of B block partition, a block size, a block shape, and a block resolution of the second coding block.

(B5) In some embodiments of B3 or B4, a block resolution of the first coding block is greater than a resolution threshold; a block resolution of the second coding block is less than the resolution threshold; and the first number is greater than the second number.

(B6) In some embodiments of B3 or B4, a block resolution of the first coding block is greater than a resolution threshold; a block resolution of the second coding block is less than the resolution threshold; and the first number is less than the second number.

(B7) In some embodiments of any of B3-B6, a block size of the first coding block is greater than a block size threshold; a block size of the second coding block is less than the block size threshold; and the first number is greater than the second number.

(B8) In some embodiments of any of B3-B6, a block size of the first coding block is greater than a block size threshold; a block size of the second coding block is less than the block size threshold; and the first number is less than the second number.

(B9) In some embodiments of any of B3-B8, each of the first number of lines and the second number of lines of reference samples includes a respective row of reference samples in the respective reference area.

(B10) In some embodiments of any of B3-B8, each of the first number of lines and the second number of lines of reference samples includes a respective column of reference samples in the respective reference area.

(B11) In some embodiments of any of B3-B10, the video bitstream signals a reference area index for each of the first coding block and the second coding block, the method the method 900 further includes determining the first number based on the reference area index of the first coding block; and determining the second number based on the reference area index of the second coding block.

(B12) In some embodiments of B11, the first number is determined using a look-up table based on the reference area index of the first coding block, and the second number is determined using the look-up table based on the reference area index of the second coding block.

(B13) In some embodiments of B11 or B12, for each of the first coding block and the second coding block, the reference area index is signaled in the video bitstream at one of B block level, a superblock level, an image frame level, a key frame level, and an image sequence level for the respective coding block.

(B14) In some embodiments of any of B1-B13, for each of the first and second coding blocks, the reference area of the respective coding block includes one or more of: a top left reference region, a top reference region, a top right reference region, a bottom left reference region, and a left reference region of the respective coding block.

(B15) In some embodiments of any of B1-B14, combining the first luma sample and the plurality of hypothesis values further comprises: based on the plurality of weighing factors, combining the first luma sample and the plurality of hypothesis values with at least one of (1) a non-linear term of B subset of the first luma sample and the plurality of neighboring luma samples and (2) a bias term.

(B16) In some embodiments of any of B1-B15, determining the plurality of weighing factors the method 900 further includes determining a least mean square (LMS) value based on the set of one or more reference samples; and iteratively adjusting the plurality of weighing factors to reduce the LMS value until the LMS value satisfy a predefined criterion.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., B1-B16 above).

In yet another aspect, some embodiments include a non-transitory computer-readable storage medium storing one or more sets of instructions for execution by control circuitry of a computing system, the one or more sets of instructions including instructions for performing any of the methods described herein (e.g., B1-B16 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
   receiving a video bitstream including a current coding block of a current image frame and a first syntax element for a cross-component intra prediction (CCIP) mode indicating whether each chroma sample of the current coding block is determined based on one or more luma samples;
   selecting one of a plurality of hypothesis tap combinations for the current coding block;
   generating a plurality of hypothesis values based on a plurality of neighboring luma samples of a first luma sample according to the selected one of the plurality of hypothesis tap combinations;
   generating a first chroma sample co-located with the first luma sample by combining the first luma sample, the plurality of hypothesis values, and at least one of a non-linear term, and a bias term; and
   reconstructing the current coding block including the first chroma sample.

2. The method of claim 1, wherein the video bitstream further comprises a second syntax element for a hypothesis tap index, wherein the selected one of the plurality of hypothesis tap combination is selected based on the hypothesis tap index, and wherein the hypothesis tap index is signaled in the video bitstream at one of a block level, a superblock level, an image frame level, a key frame level, and an image sequence level for the current coding block.

3. The method of claim 1, wherein the first luma sample is surrounded by eight closest luma sample candidates, and the plurality of hypothesis tap combinations includes:
   a first hypothesis tap combination corresponding to the first luma sample and two neighboring luma samples selected from the eight closest luma sample candidates; and
   a second hypothesis tap combination corresponding to the first luma sample and four neighboring luma samples selected from the eight closest luma sample candidates.

4. The method of claim 1, wherein the plurality of hypothesis tap combinations includes:
   a first hypothesis tap combination corresponding to the first luma sample, a north luma sample, a south luma sample, a west luma sample, and an east luma sample; and
   a second hypothesis tap combination corresponding to the first luma sample, a northwest luma sample, a northeast luma sample, a southwest luma sample, and a southeast luma sample.

5. The method of claim 1, wherein the plurality of hypothesis tap combinations includes:
   a first hypothesis tap combination corresponding to the first luma sample, a north luma sample located immediately above the first luma sample, and a south luma sample located immediately below the first luma sample;
   a second hypothesis tap combination corresponding to the first luma sample, a west luma sample located immediately to the left of the first luma sample, and an east luma sample located immediately to the right of the first luma sample;
   a third hypothesis tap combination corresponding to the first luma sample, a northwest (NW) luma sample, and a southeast (SE) luma sample, wherein locations of the northwest (NW) luma sample and the southeast (SE) luma sample are symmetric with respect to a location of the first luma sample; and
   a fourth hypothesis tap combination corresponding to the first luma sample, a southwest (SW) luma sample, and a northeast (NE) luma sample, wherein locations of the southwest (SW) luma sample and the northeast (NE) luma sample are symmetric with respect to the location of the first luma sample.

6. The method of claim 1, wherein the one of the plurality of hypothesis tap combinations corresponds to the first luma sample, a north luma sample located immediately above the first luma sample, and a south luma sample located immediately below the first luma sample.

7. The method of claim 1, wherein the one of the plurality of hypothesis tap combinations corresponds to the first luma sample, a west luma sample located immediately to the left of the first luma sample, and an east luma sample located immediately to the right of the first luma sample.

8. The method of claim 1, wherein the plurality of hypothesis tap combinations includes:
   a first hypothesis tap combination corresponding to the first luma sample, a north luma sample located immediately above the first luma sample, and a south luma sample located immediately below the first luma sample; and
   a second hypothesis tap combination corresponding to the first luma sample, two or more west luma samples located immediately to the left of the first luma sample, and two or more east luma sample located immediately to the right of the first luma sample.

9. The method of claim 1, wherein the non-linear term corresponds to a subset of the first luma sample and the plurality of neighboring luma samples, and wherein the bias term is based on a plurality of weighing factors.

10. The method of claim 9, further comprising:
determining the plurality of weighing factors based on a set of one or more luma samples and a set of one or more co-located chroma samples within a reference area of the current coding block, wherein the reference area located in the current image frame.

11. The method of claim 1, further comprising:
identifying a first reference area for the current coding block; and
identifying a second reference area for a second coding block, the second reference area having a different size than the first reference area.

12. The method of claim 11, wherein the first reference area consists of a first number of reference lines, and wherein the second reference area consists of a second number of reference lines different than the first number of reference lines.

13. The method of claim 12, further comprising determining the first number of reference lines based on at least one of a block partition, a block size, a block shape, and a block resolution of the current coding block.

14. The method of claim 11, wherein the first reference area is identified based on a reference area index signaled in the video bitstream.

15. The method of claim 1, further comprising determining a reference area for the current coding block, wherein the plurality of neighboring luma samples correspond to the reference area.

16. A method for encoding video data, comprising:
receiving video data that includes a current block of a current image frame;
determining that a cross-component intra prediction (CCIP) mode is to be applied for the current block, the CCIP mode indicating whether each chroma sample of the current block is determined based on one or more luma samples;
selecting, from a plurality of hypothesis tap combinations, a hypothesis tap combination for the current block;
generating a plurality of hypothesis values based on a plurality of neighboring luma samples of a first luma sample according to the selected hypothesis tap combination;
generating a first chroma sample co-located with the first luma sample by combining the first luma sample, the plurality of hypothesis values, and at least one of a non-linear term, and a bias term; and
encoding the current block including the first chroma sample.

17. The method of claim 16, wherein the selected hypothesis tap combination corresponds to the first luma sample, a north luma sample located immediately above the first luma sample, and a south luma sample located immediately below the first luma sample.

18. The method of claim 16, wherein the selected hypothesis tap combination corresponds to the first luma sample, a west luma sample located immediately to the left of the first luma sample, and an east luma sample located immediately to the right of the first luma sample.

19. The method of claim 16, wherein the non-linear term corresponds to a subset of the first luma sample and the plurality of neighboring luma samples, and wherein the bias term is based on a plurality of weighing factors.

20. The method of claim 1, further comprising:
identifying a first reference area for the current block; and
identifying a second reference area for a second block, the second reference area having a different size than the first reference area.

21. A non-transitory computer-readable storage medium storing a video bitstream that is generated by a video encoding method, the video encoding method comprising:
determining that a cross-component intra prediction (CCIP) mode is to be applied for a current block of video data, the CCIP mode indicating whether each chroma sample of the current block is determined based on one or more luma samples;
selecting, from a plurality of hypothesis tap combinations, a hypothesis tap combination for the current block;
generating a plurality of hypothesis values based on a plurality of neighboring luma samples of a first luma sample according to the selected hypothesis tap combination;
generating a first chroma sample co-located with the first luma sample by combining the first luma sample, the plurality of hypothesis values, and at least one of a non-linear term, and a bias term; and
encoding the current block including the first chroma sample; and
wherein the video bitstream comprises the encoded current block and a first syntax element indicating that the CCIP mode is to be applied for the current block.

22. The non-transitory computer-readable storage medium of claim 21, wherein the video bitstream further comprises a second syntax element indicating a hypothesis tap index corresponding to the selected hypothesis tap combination.

23. The non-transitory computer-readable storage medium of claim 21, wherein the video bitstream further comprises a second syntax element indicating a size of a reference area for the current block.

24. The non-transitory computer-readable storage medium of claim 21, wherein the selected hypothesis tap combination corresponds to the first luma sample, a north luma sample located immediately above the first luma sample, and a south luma sample located immediately below the first luma sample.

25. The non-transitory computer-readable storage medium of claim 21, wherein the selected hypothesis tap combination corresponds to the first luma sample, a west luma sample located immediately to the left of the first luma sample, and an east luma sample located immediately to the right of the first luma sample.

* * * * *